United States Patent
Tanaka et al.

(10) Patent No.: US 6,757,659 B1
(45) Date of Patent: Jun. 29, 2004

(54) AUDIO SIGNAL PROCESSING APPARATUS

(75) Inventors: Yoshiaki Tanaka, Fujisawa (JP); Shoji Ueno, Fujisawa (JP); Norihiko Fuchigami, Yamato (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/432,103

(22) Filed: Nov. 2, 1999

(30) Foreign Application Priority Data

Nov. 16, 1998 (JP) .......................................... 10-342352

(51) Int. Cl.$^7$ .......................... G01L 19/00; G01L 21/04
(52) U.S. Cl. ...................... 704/501; 704/503; 704/212; 704/201; 704/230; 700/94; 700/100; 381/104; 381/17; 381/106
(58) Field of Search .......................... 700/94, 500, 270, 700/278; 381/104, 107, 17, 18, 63, 106; 704/201, 230, 500–504, 203, 200.1, 219, 212; 379/202.01; 360/22; 369/59.25; 386/105

(56) References Cited

U.S. PATENT DOCUMENTS

| 5,298,895 A | | 3/1994 | Van Maren | |
|---|---|---|---|---|
| 5,400,433 A | * | 3/1995 | Davis et al. | 704/220 |
| 5,586,193 A | * | 12/1996 | Ichise et al. | 381/106 |
| 5,845,249 A | * | 12/1998 | Malladi et al. | 704/270 |
| 5,892,746 A | * | 4/1999 | Heo et al. | 369/59.25 |
| 5,987,417 A | * | 11/1999 | Heo et al. | 704/500 |
| 5,987,418 A | * | 11/1999 | Gentit | 704/500 |
| 6,097,558 A | * | 8/2000 | Oguro | 360/22 |
| 6,128,597 A | * | 10/2000 | Kolluru et al. | 704/500 |
| 6,160,953 A | * | 12/2000 | Fuchigami et al. | 386/105 |
| 6,463,410 B1 | * | 10/2002 | Fuchigami et al. | 704/219 |

FOREIGN PATENT DOCUMENTS

| EP | 0 855 715 | 7/1998 |
|---|---|---|
| EP | 0 869 496 | 10/1998 |
| JP | 11-109996 | 4/1999 |

OTHER PUBLICATIONS

"Lossless Coding for Audio Discs" by P. Craven et al; J.Audio Eng.Soc., vol. 44, No. 9; Sep. 1996; pp., 706–720.

* cited by examiner

*Primary Examiner*—Vijay Chawan
(74) *Attorney, Agent, or Firm*—Louis Woo

(57) ABSTRACT

An audio signal encoding apparatus includes a device for compressing multiple-channel digital audio signals into compression-resultant multiple-channel signals respectively. The multiple-channel digital audio signals relate to a sampling frequency and a quantization bit number. The compression-resultant multiple-channel signals, a signal representative of the sampling frequency, and a signal representative of the quantization bit number are formatted into a formatting-resultant signal. The formatting-resultant signal contains a sub packet and a sync information portion. The sub packet contains at least portions of the compression-resultant multiple-channel signals. The sync information portion contains the signal representative of the sampling frequency and the signal representative of the quantization bit number.

6 Claims, 15 Drawing Sheets

AUDIO PACK

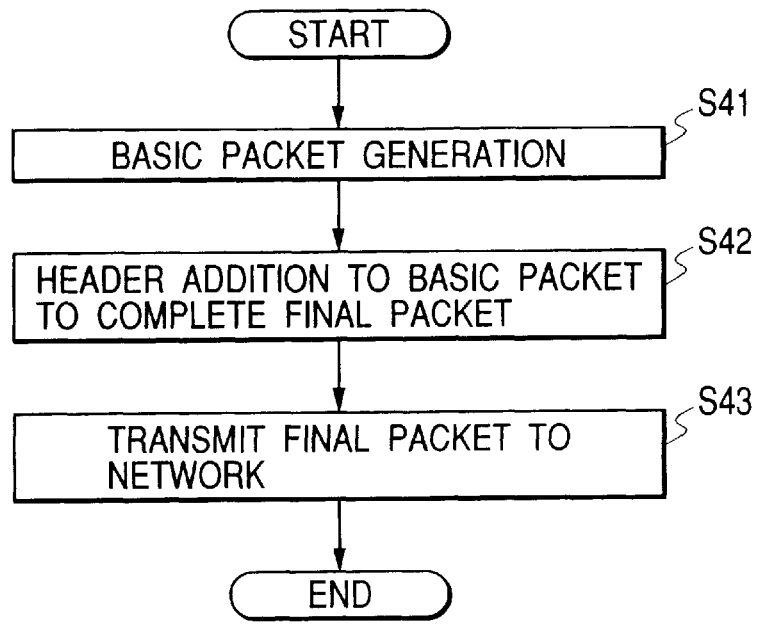
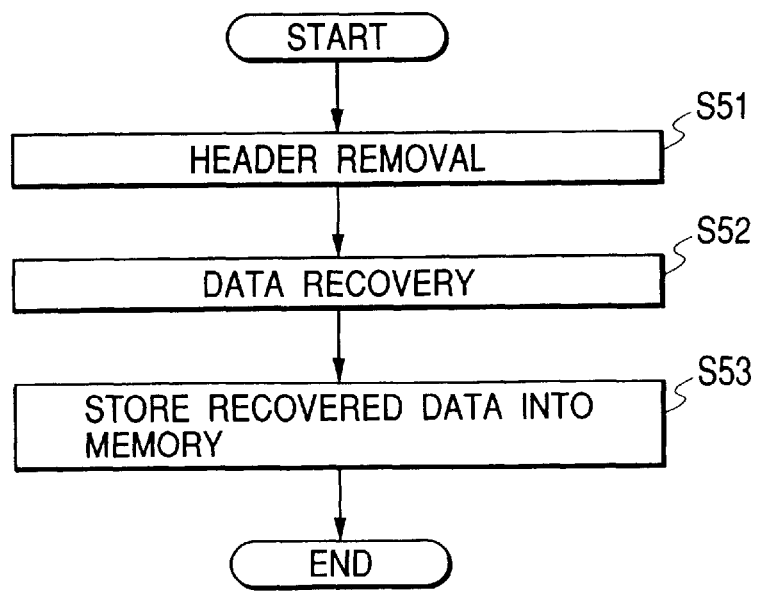

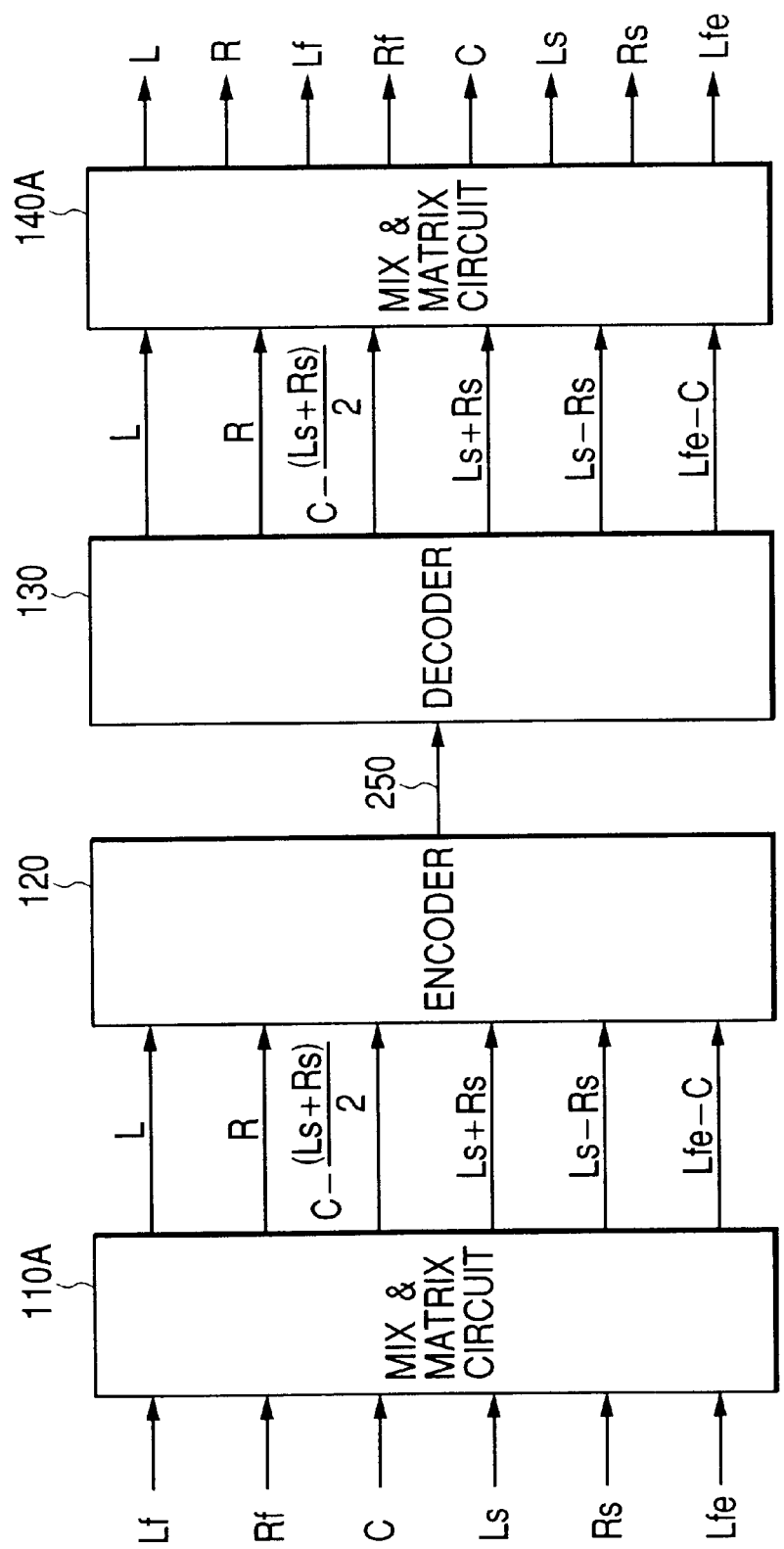

AUDIO SIGNAL PROCESSING APPARATUS

BACKGROUND OF THE INVENTION

1. Field of the Invention

This invention relates to an audio signal encoding apparatus. This invention also relates to an optical recording medium. In addition, this invention relates to an audio signal decoding apparatus. Furthermore, this invention relates to a method of transmitting an audio signal, and a transmission medium.

2. Description of the Related Art

Highly efficient encoding of an audio signal includes a step of compressing the audio signal. Highly efficient encoding techniques are classified into two types; the lossy encoding techniques and the lossless encoding techniques. Among the lossy encoding techniques, the "acoustic encoding" is well known as a technique which renders the data deterioration acoustically undetectable. On the other hand, according to the lossless encoding and decoding techniques, the recovered data are exactly the same as the original data.

In general, a sampled or uniformly quantized audio signal has significant redundancy. During the encoding of such an audio signal, the degree of the compression of the audio signal rises as redundancy is more effectively removed therefrom.

SUMMARY OF THE INVENTION

It is a first object of this invention to provide an improved audio signal encoding apparatus.

It is a second object of this invention to provide an improved optical recording medium.

It is a third object of this invention to provide an improved audio signal decoding apparatus.

It is a fourth object of this invention to provide an improved method of transmitting an audio signal.

It is a fifth object of this invention to provide an improved transmission medium.

A first aspect of this invention provides an audio signal encoding apparatus comprising means for compressing multiple-channel digital audio signals into compression-resultant multiple-channel signals respectively, the multiple-channel digital audio signals relating to a sampling frequency and a quantization bit number; and means for formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number.

A second aspect of this invention provides an optical recording medium storing a formatting-resultant signal containing a sub packet and a sync information portion, the sub packet containing at least portions of compression-resultant multiple-channel signals which result from compressing multiple-channel digital audio signals respectively, the sync information portion containing a signal representative of a sampling frequency related to the multiple-channel digital audio signals and a signal representative of a quantization bit number related to the multiple-channel digital audio signals.

A third aspect of this invention provides an audio signal decoding apparatus comprising means for separating a formatting-resultant signal into a sub packet and a sync information portion; means for extracting compression-resultant multiple-channel signals from the sub packet; means for expanding the extracted compression-resultant multiple-channel signals into multiple-channel digital audio signals respectively; means for extracting a signal representative of a sampling frequency and a signal representative of a quantization bit number from the sync information portion; and means for converting the multiple-channel digital audio signals into analog audio signals in response to the signal representative of the sampling frequency and the signal representative of the quantization bit number.

A fourth aspect of this invention provides a method of transmitting an audio signal. The method comprises the steps of compressing multiple-channel digital audio signals into compression-resultant multiple-channel signals respectively, the multiple-channel digital audio signals relating to a sampling frequency and a quantization bit number; formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number; and transmitting the formatting-resultant signal through a communication line.

A fifth aspect of this invention provides an audio signal encoding apparatus comprising means for compressing multiple-channel digital audio signals into compression-resultant multiple-channel signals respectively; and means for formatting the compression-resultant multiple-channel signals and an identifier into a formatting-resultant signal, the formatting-resultant signal containing a sub packet and a sync information portion, the sub packet containing at least portions of the compression-resultant multiple-channel signals, the sync information portion containing the identifier, the identifier representing that signals in the sub packet are compression-resultant signals.

A sixth aspect of this invention provides an optical recording medium storing a formatting-resultant signal containing a sub packet and a sync information portion, the sub packet containing at least portions of compression-resultant multiple-channel signals which result from compressing multiple-channel digital audio signals respectively, the sync information portion containing an identifier representing that signals in the sub packet are compression-resultant signals.

A seventh aspect of this invention provides an audio signal decoding apparatus comprising means for separating a formatting-resultant signal into a sub packet and a sync information portion; means for extracting compression-resultant multiple-channel signals from the sub packet; means for extracting an identifier from the sync information portion, the identifier representing that signals in the sub packet are compression-resultant signals; and means for expanding the extracted compression-resultant multiple-channel signals into multiple-channel digital audio signals in response to the extracted identifier, respectively.

An eighth aspect of this invention provides a method of transmitting an audio signal. The method comprises the steps of compressing multiple-channel digital audio signals into compression-resultant multiple-channel signals respectively; formatting the compression-resultant multiple-channel signals and an identifier into a formatting-resultant signal, the formatting-resultant signal containing a sub packet and a sync information portion, the sub packet containing at least portions of the compression-resultant multiple-channel signals, the sync information portion containing the identifier, the identifier representing that signals in the sub packet are compression-resultant signals; and transmitting the formatting-resultant signal through a communication line.

A ninth aspect of this invention provides a DVD-audio disc storing an audio pack loaded with a formatting-resultant signal containing a sub packet and a sync information portion, the sub packet containing at least portions of compression-resultant multiple-channel signals which result from compressing multiple-channel digital audio signals respectively, the sync information portion containing a signal representative of a sampling frequency related to the multiple-channel digital audio signals and a signal representative of a quantization bit number related to the multiple-channel digital audio signals.

A tenth aspect of this invention is based on the third aspect thereof, and provides an audio signal decoding apparatus further comprising means for separating an audio packet from an audio pack, the audio packet containing said formatting-resultant signal.

An eleventh aspect of this invention provides a DVD-audio disc storing an audio pack loaded with a formatting-resultant signal containing a sub packet and a sync information portion, the sub packet containing at least portions of compression-resultant multiple-channel signals which result from compressing multiple-channel digital audio signals respectively, the sync information portion containing an identifier representing that signals in the sub packet are compression-resultant signals.

A twelfth aspect of this invention is based on the seventh aspect thereof, and provides an audio signal decoding apparatus further comprising means for separating an audio packet from an audio pack, the audio packet containing said formatting-resultant signal.

A thirteenth aspect of this invention provides a transmission medium for transmitting data being in a format and being made by a method comprising the steps of compressing multiple-channel digital audio signals into compression-resultant multiple-channel signals respectively; and formatting the compression-resultant multiple-channel signals and an identifier into a formatting-resultant signal, the formatting-resultant signal containing a sub packet and a sync information portion, the sub packet containing at least portions of the compression-resultant multiple-channel signals, the sync information portion containing the identifier, the identifier representing that signals in the sub packet are compression-resultant signals.

A fourteenth aspect of this invention provides a transmission medium for transmitting a formatting-resultant signal containing a sub packet and a sync information portion, the sub packet containing at least portions of compression-resultant multiple-channel signals which result from compressing multiple-channel digital audio signals respectively, the sync information portion containing an identifier representing that signals in the sub packet are compression-resultant signals.

A fifteenth aspect of this invention provides a transmission medium for transmitting a formatting-resultant signal which is decoded by an audio signal decoding apparatus comprising means for separating the formatting-resultant signal into a sub packet and a sync information portion; means for extracting compression-resultant multiple-channel signals from the sub packet; means for extracting an identifier from the sync information portion, the identifier representing that signals in the sub packet are compression-resultant signals; and means for expanding the extracted compression-resultant multiple-channel signals into multiple-channel digital audio signals in response to the extracted identifier, respectively.

A sixteenth aspect of this invention provides a transmission medium for transmitting an audio signal by a method comprising the steps of compressing multiple-channel digital audio signals into compression-resultant multiple-channel signals respectively; formatting the compression-resultant multiple-channel signals and an identifier into a formatting-resultant signal, the formatting-resultant signal containing a sub packet and a sync information portion, the sub packet containing at least portions of the compression-resultant multiple-channel signals, the sync information portion containing the identifier, the identifier representing that signals in the sub packet are compression-resultant signals; and transmitting the formatting-resultant signal through a communication line.

A seventeenth aspect of this invention provides a transmission medium for transmitting data being in a format and being made by an audio signal encoding apparatus comprising means for compressing multiple-channel digital audio signals into compression-resultant multiple-channel signals respectively, the multiple-channel digital audio signals relating to a sampling frequency and a quantization bit number; and means for formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number.

An eighteenth aspect of this invention provides a transmission medium for transmitting a formatting-resultant signal containing a sub packet and a sync information portion, the sub packet containing at least portions of compression-resultant multiple-channel signals which result from compressing multiple-channel digital audio signals respectively, the sync information portion containing a signal representative of a sampling frequency related to the multiple-channel digital audio signals and a signal representative of a quantization bit number related to the multiple-channel digital audio signals.

A nineteenth aspect of this invention provides a transmission medium for transmitting a formatting-resultant signal which is decoded by an audio signal decoding apparatus comprising means for separating a formatting-resultant signal into a sub packet and a sync information portion; means for extracting compression-resultant multiple-channel signals from the sub packet; means for expanding the extracted compression-resultant multiple-channel signals into multiple-channel digital audio signals respectively; means for extracting a signal representative of a sampling frequency and a signal representative of a quantization bit number from the sync information portion; and means for converting the multiple-channel digital audio signals into analog audio signals in response to the signal representative of the sampling frequency and the signal representative of the quantization bit number.

A twentieth aspect of this invention provides a transmission medium for transmitting an audio signal by a method comprising the steps of compressing multiple-channel digital audio signals into compression-resultant multiple-channel signals respectively, the multiple-channel digital audio signals relating to a sampling frequency and a quantization bit number; formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number; and transmitting the formatting-resultant signal through a communication line.

A twenty-first aspect of this invention provides an audio signal encoding apparatus comprising an fs conversion circuit for equalizing sampling frequencies of first multiple-channel digital audio signals to convert a set of the first multiple-channel digital audio signals into a set of second multiple-channel digital audio signals; means for compressing the second multiple-channel digital audio signals into compression-resultant multiple-channel signals respectively, the second multiple-channel digital audio signals relating to a sampling frequency and a quantization bit number; and means for formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number.

A twenty-second aspect of this invention provides an optical recording medium storing a formatting-resultant signal containing a sub packet and a sync information portion, the sub packet containing at least portions of compression-resultant multiple-channel signals which result from equalizing sampling frequencies of multiple-channel digital audio signals and then compressing the multiple-channel digital audio signals respectively, the sync information portion containing a signal representative of a sampling frequency related to the multiple-channel digital audio signals and a signal representative of a quantization bit number related to the multiple-channel digital audio signals.

A twenty-third aspect of this invention provides a method of transmitting an audio signal, comprising the steps of equalizing sampling frequencies of first multiple-channel digital audio signals to convert a set of the first multiple-channel digital audio signals into a set of second multiple-channel digital audio signals; compressing the second multiple-channel digital audio signals into compression-resultant multiple-channel signals respectively, the second multiple-channel digital audio signals relating to a sampling frequency and a quantization bit number; formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number; and transmitting the formatting-resultant signal through a communication line.

A twenty-fourth aspect of this invention provides a transmission medium for transmitting an audio signal by a method comprising the steps of equalizing sampling frequencies of first multiple-channel digital audio signals to convert a set of the first multiple-channel digital audio signals into a set of second multiple-channel digital audio signals; compressing the second multiple-channel digital audio signals into compression-resultant multiple-channel signals respectively, the second multiple-channel digital audio signals relating to a sampling frequency and a quantization bit number; formatting the compression-resultant multiple-channel signals, a signal representative of the sampling frequency, and a signal representative of the quantization bit number into a formatting-resultant signal, the formatting-resultant signal containing a sub packet and a sync information portion, the sub packet containing at least portions of the compression-resultant multiple-channel signals, the sync information portion containing the signal representative of the sampling frequency and the signal representative of the quantization bit number; and transmitting the formatting-resultant signal through a communication line.

BRIEF DESCRIPTION OF THE DRAWINGS

FIG. 12 is a flowchart of a segment of a control program for a packeting processor in FIG. 11.

FIG. 13 is a flowchart of a segment of a control program for a de-packeting processor in FIG. 11.

FIG. 14 is a block diagram of a system including an audio signal encoding apparatus and an audio signal decoding apparatus according to a fourth embodiment of this invention.

DESCRIPTION OF THE PREFERRED EMBODIMENTS

First Embodiment

Figure 1:
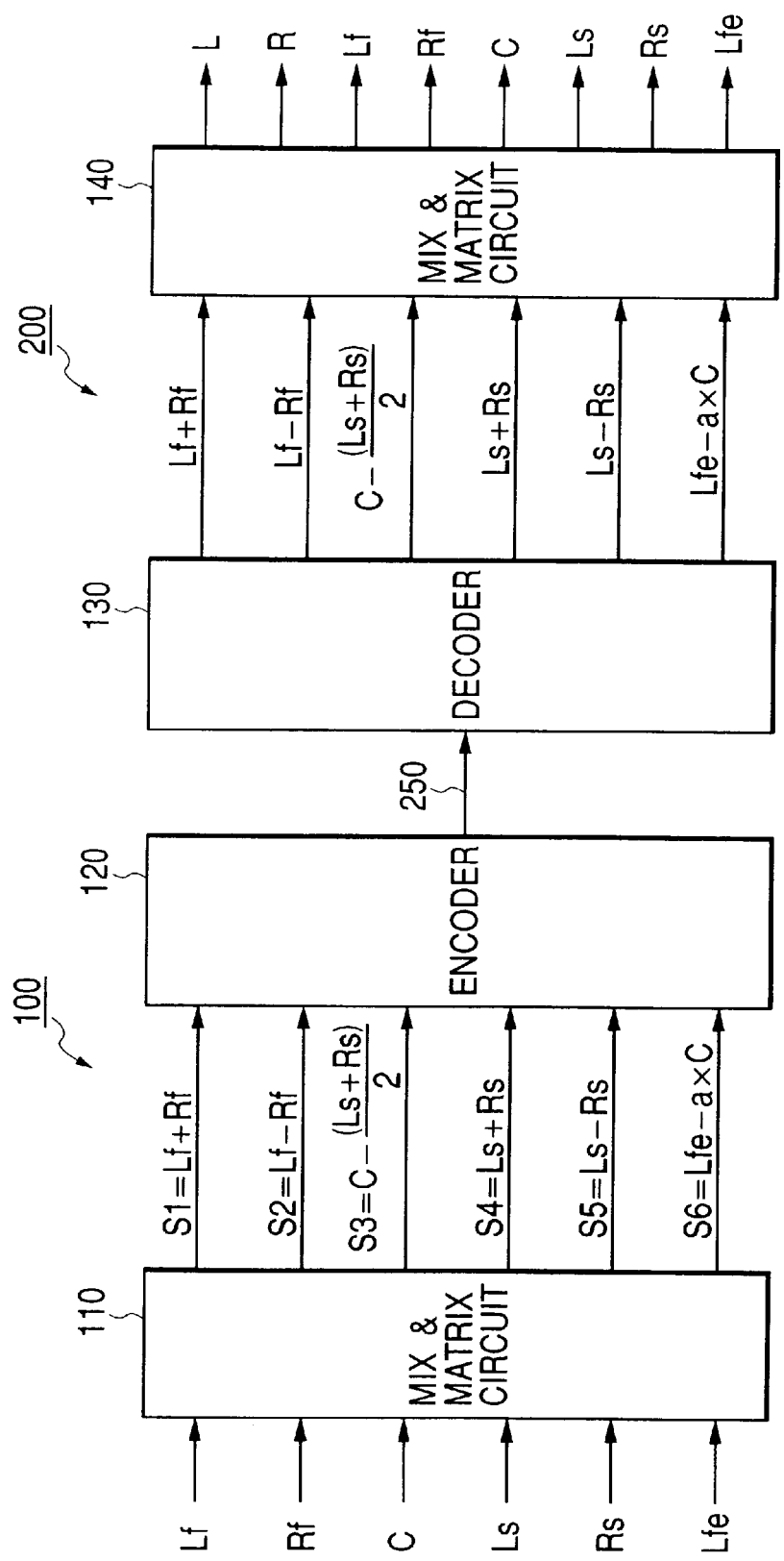
FIG. 1 is a block diagram of a system including an audio signal encoding apparatus and an audio signal decoding apparatus according to a first embodiment of this invention.

With reference to FIG. 1, an audio signal encoding apparatus 100 includes a mix and matrix circuit 110 and an encoder 120. The mix and matrix circuit 110 is followed by the encoder 120. An audio signal decoding apparatus 200 includes a decoder 130 and a mix and matrix circuit 140. The decoder 130 is followed by the mix and matrix circuit 140. The audio signal encoding apparatus 100 and the audio signal decoding apparatus 200 are connected via a transmission line 250. The transmission line 250 includes a communication line or a communication network. Alternatively, the transmission line 250 may include a combination of a recording unit, a recording medium, and a reproducing unit. For example, the recording medium is a DVD-audio, another optical disc, or a magnetic disc.

The audio signal encoding apparatus 100 receives 6-channel input digital audio signals, that is, a left-front digital audio signal Lf, a right-front digital audio signal Rf, a center digital audio signal C, a left-surround digital audio signal Ls, a right-surround digital audio signal Rs, and a low-frequency-effect digital audio signal Lfe. The left-front digital audio signal Lf results from quantization of a left-front analog audio signal at a predetermined sampling frequency fs and a predetermined quantization bit number Qb. The predetermined sampling frequency fs is equal to, for example, 96 kHz or 192 kHz. The predetermined quantization bit number Qb is equal to, for example, 20 or 24. Similarly, each of the right-front digital audio signal Rf, the center digital audio signal C, the left-surround digital audio signal Ls, the right-surround digital audio signal Rs, and the low-frequency-effect digital audio signal Lfe results from quantization of a corresponding analog audio signal at the predetermined sampling frequency and the predetermined quantization bit number. The audio signal encoding apparatus 100 encodes the 6-channel input digital audio signals into a bit stream which is an encoding-resultant digital audio signal. The audio signal encoding apparatus 100 outputs the encoding-resultant digital audio signal to the transmission line 250.

The encoding-resultant digital audio signal is propagated to the audio signal decoding apparatus 200 via the transmission line 250. In the case where the transmission line 250 includes the combination of the recording unit, the recording medium, and the reproducing unit, the encoding-resultant digital audio signal is recorded on the recording medium via the recording unit while the encoding-resultant digital audio signal is read out from the recording medium via the reproducing unit. The audio signal decoding apparatus 200 decodes the encoding-resultant digital audio signal into the original 6-channel digital audio signals, that is, the original left-front digital audio signal Lf, the original right-front digital audio signal Rf, the original center digital audio signal C, the original left-surround digital audio signal Ls, the original right-surround digital audio signal Rs, and the original low-frequency-effect digital audio signal Lfe. In other words, the audio signal decoding apparatus 200 recovers the 6-channel original digital audio signals (the 6-channel input digital audio signals). The audio signal decoding apparatus 200 outputs the 6-channel recovered digital audio signals to an external apparatus.

The mix and matrix circuit 110 in the audio signal encoding apparatus 100 receives the 6-channel input digital audio signals, that is, the left-front digital audio signal Lf, the right-front digital audio signal Rf, the center digital audio signal C, the left-surround digital audio signal Ls, the right-surround digital audio signal Rs, and the low-frequency-effect digital audio signal Lfe. The mix and matrix circuit 110 includes an adder which adds the left-front digital audio signal Lf and the right-front digital audio signal Rf into a first calculation-result signal S1. The first calculation-result signal S1 is given by the relation as "S1=Lf+Rf". The first calculation-result signal is also denoted by Lf+Rf. The first calculation-result signal S1 is a PCM signal. The mix and matrix circuit 110 includes a subtracter which subtracts the right-front digital audio signal Rf from the left-front digital audio signal Lf to generate a second calculation-result signal S2. The second calculation-result signal S2 is given by the relation as "S2=Lf−Rf". The second calculation-result signal is also denoted by Lf−Rf. The second calculation-result signal S2 is a PCM signal. The mix and matrix circuit 110 includes a combination of an adder, a 1/2 divider, and a subtracter which processes the center digital audio signal C, the left-surround digital audio signal Ls, and the right-surround digital audio signal Rs into a third calculation-result signals 3. The third calculation-result signal S3 is given by the relation as $$\text{``}S3 = C - \left(\frac{Ls + Rs}{2}\right)\text{''}.$$

The third calculation-result signal is also denoted by C−(Ls+Rs)/2. The third calculation-result signal S3 is a PCM signal. The mix and matrix circuit 110 includes an adder which adds the left-surround digital audio signal Ls and the right-surround digital audio signal Rs into a fourth calculation-result signal S4. The fourth calculation-result signal S4 is given by the relation as "S4=Ls+Rs". The fourth calculation-result signal is also denoted by Ls+Rs. The fourth calculation-result signal S4 is a PCM signal. The mix and matrix circuit 110 includes a subtracter which subtracts the right-surround digital audio signal Rs from the left-surround digital audio signal Ls to generate a fifth calculation-result signal S5. The fifth calculation-result signal S5 is given by the relation as "S5=Ls−Rs". The fifth calculation-result signal S5 is also denoted by Ls−Rs. The fifth calculation-result signal S5 is a PCM signal. The mix and matrix circuit 10 includes a combination of a multiplier and a subtracter which processes the center digital audio signal C and the low-frequency-effect digital audio signal Lfe into a sixth calculation-result signal S6. The sixth calculation-result signal S6 is given by the relation as "S6=Lfe−a×C" where "×" denotes a product operator or a multiplication operator, and "a" denotes a fixed or variable coefficient in the range between 0 and 1. The sixth calculation-result signal is also denoted by Lfe−a×C. The sixth calculation-result signal S6 is a PCM signal. A signal representative of the coefficient "a" is applied to the mix and matrix circuit 110 from an external. In the case where 6-channel input digital audio signals are different in sampling frequency and quantization bit number, an up-sampling device (not shown) precedes the mix and matrix circuit 110. The up-sampling device processes digital audio signals among the 6-channel input digital audio signals which relate to a lower sampling frequency and a lower quantization bit number. Specifically, the up-sampling device converts such digital audio signals into corresponding digital audio signals which are equal in sampling frequency and quantization bit number to the other digital audio signals among the 6-channel input digital audio signals. Accordingly, the 6-channel digital audio signals which result from the processing by the up-sampling device are equal to each other in sampling frequency and quantization bit number. The processing-resultant 6-channel digital audio signals are fed to the mix and matrix circuit 110 as 6-channel input digital audio signals.

In the audio signal encoding apparatus 100, the mix and matrix circuit 110 outputs the first, second, third, fourth, fifth, and sixth calculation-result signals S1, S2, S3, S4, S5, and S6 to the encoder 120. The device 120 encodes the calculation-result signals S1–S6 into a bit stream which is an encoding-resultant digital audio signal. The encoder 120 outputs the encoding-resultant digital audio signal to the transmission line 250.

Figure 2:
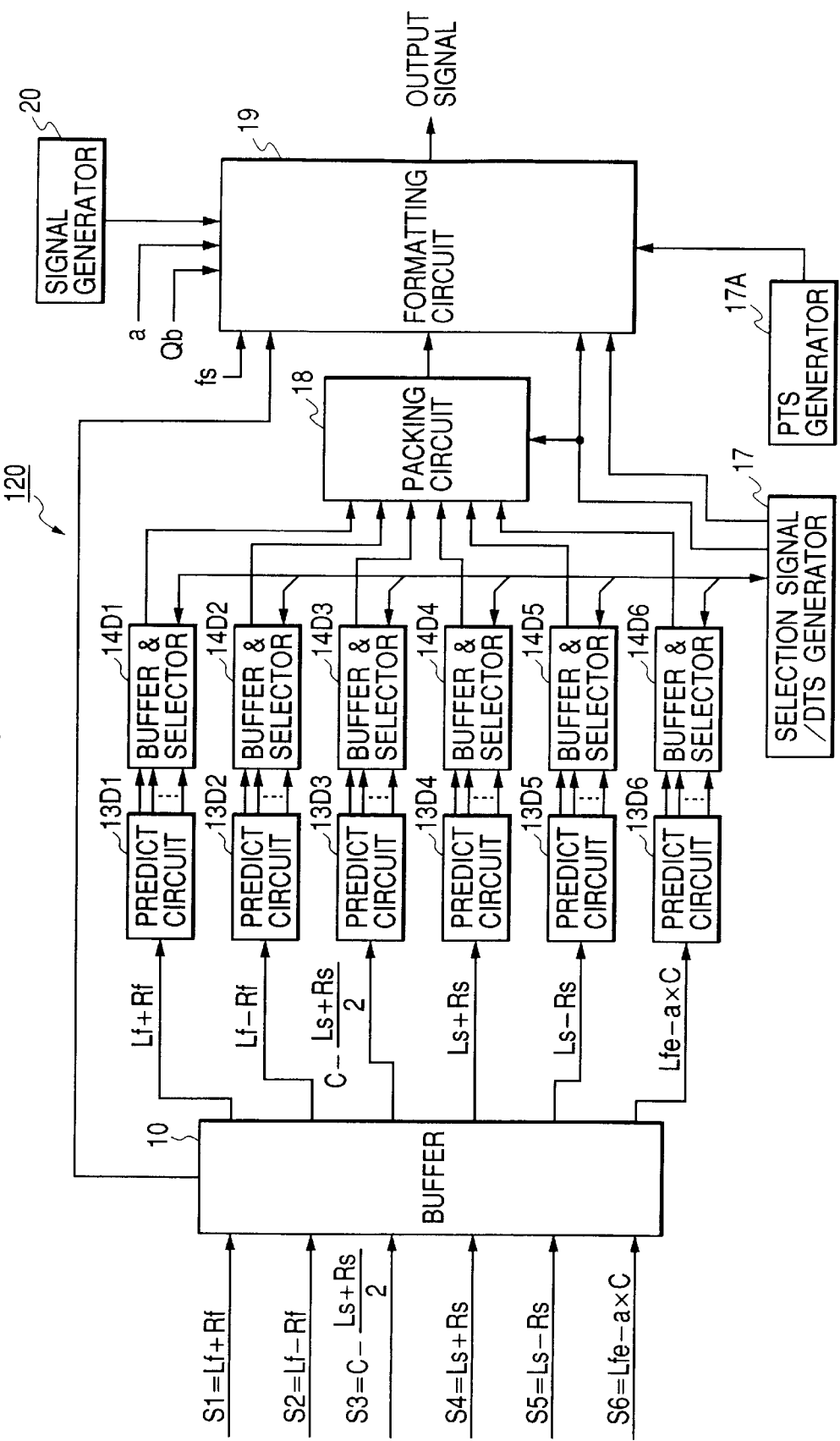
FIG. 2 is a block diagram of an encoder in FIG. 1.

As shown in FIG. 2, the encoder 120 includes a buffer (a memory) 10. A sequence of samples of each of the calculation-result signals S1, S2, S3, S4, S5, and S6 is applied to the buffer 10. The calculation-result signals S1–S6 are stored into the buffer 10 frame by frame. Every frame is composed of a predetermined number of successive samples. Samples of the calculation-result signal S1, that is, the calculation-result signal Lf+Rf, are sequentially transmitted from the buffer 10 to a prediction circuit 13D1. Samples of the calculation-result signal S2, that is, the calculation-result signal Lf–Rf, are sequentially transmitted from the buffer 10 to a prediction circuit 13D2. Samples of the calculation-result signal S3, that is, the calculation-result signal C–(Ls+Rs)/2, are sequentially transmitted from the buffer 10 to a prediction circuit 13D3.

Samples of the calculation-result signal S4, that is, the calculation-result signal Ls+Rs, are sequentially transmitted from the buffer 10 to a prediction circuit 13D4. Samples of the calculation-result signal S5, that is, the calculation-result signal Ls–Rs, are sequentially transmitted from the buffer 10 to a prediction circuit 13D5. Samples of the calculation-result signal S6, that is, the calculation-result signal Lfe–a×C, are sequentially transmitted from the buffer 10 to a prediction circuit 13D6. For every frame, the first samples of the respective calculation-result signals S1–S6 are transmitted from the buffer 10 to a formatting circuit 19.

Figure 3:
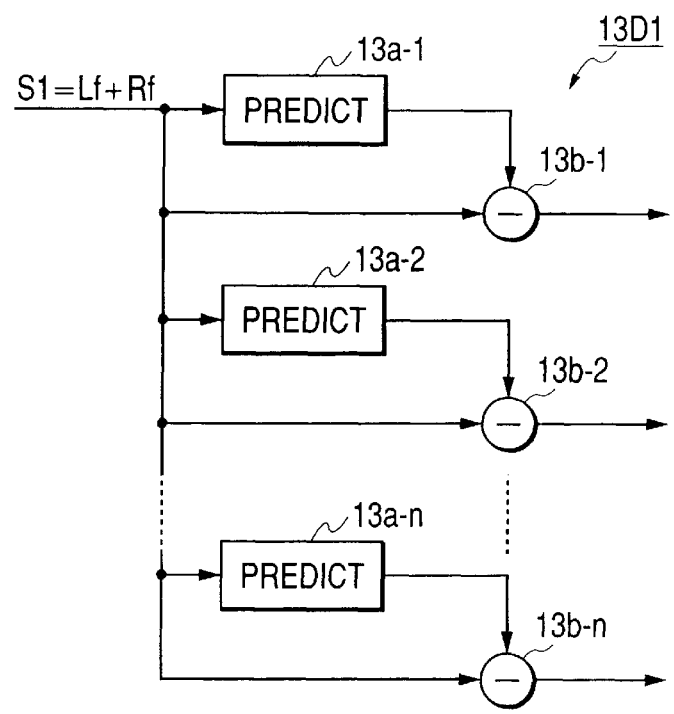
FIG. 3 is a block diagram of a prediction circuit in FIG. 2.

The prediction circuits 13D1–13D6 are similar to each other. Accordingly, only the prediction circuit 13D1 will be explained in detail hereinafter. As shown in FIG. 3, the prediction circuit 13D1 includes predictors 13$a$-1, 13$a$-2, . . . , and 13$a$-n, and subtracters 13$b$-1, 13$b$-2, . . . , and 13$b$-n, where "n" denotes a predetermined natural number equal to or greater than 2. The predictors 13$a$-1, 13$a$-2, . . . , and 13$a$-n receive every sample of the calculation-result signal S1 (that is, the calculation-result signal Lf+Rf) from the buffer 10. Also, the subtracters 13$b$-1, 13$b$-2, . . . , and 13$b$n receive every sample of the calculation-result signal S1 from the buffer 10. The predictors 13$a$-1, 13$a$-2, . . . , and 13$a$-n have different prediction characteristics, respectively. Specifically, the predictors 13$a$-1, 13$a$-2, . . . , and 13$a$-n are different from each other in prediction coefficients. Each of the predictors 13$a$-1, 13$a$-2, and 13$a$-n predicts a current sample of the calculation-result signal S1 from preceding samples thereof in response to the related prediction coefficients. Thus, the predictors 13$a$-1, 13$a$-2, . . . , and 13$a$-n generate prediction-result signals for the calculation-result signal S1 (that is, the calculation-result signal Lf+Rf) in response to the prediction coefficients, respectively. The predictors 13$a$-1, 13$a$-2, . . . , and 13$a$-n output the prediction-result signals to the subtracters 13$b$-1, 13$b$-2, . . . , and 13$b$-n respectively. For every sample, each of the subtracters 13$b$-1, 13$b$-2, . . . , and 13$b$-n subtracts the related prediction-result signal from the calculation-result signal S1, and hence generates a signal representing the prediction error between the prediction-result signal and the calculation-result signal S1. The subtracters 13$b$-1, 13$b$-2, . . . , and 13$b$-n output the respective prediction-error signals to a buffer and selector 14D1.

The prediction-error signals, that is, the output signals of the subtracters 13$b$-1, 13$b$-2, . . . , and 13$b$-n, are temporarily stored in a memory within the buffer and selector 14D1. A selection signal/DTS (decoding time stamp) generator 17 produces a first selection signal. The selection signal/DTS generator 17 outputs the first selection signal to the buffer and selector 14D1. The first selection signal is designed to select the smallest one from among the prediction-error signals in the memory of the buffer and selector 14D1 as an output signal of an optimum subtracter (an optimum predictor) for every sub-frame. Specifically, for every sub-frame, the selection signal/DTS generator 17 searches the memory within the buffer and selector 14D1 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal/DTS generator 17 enables the buffer and selector 14D1 to output the smallest prediction-error signal from the memory to a packing circuit 18 as the selected (Lf+Rf)-related prediction-error signal for every sub-frame.

Every sub-frame is composed of a predetermined number of successive samples. Several tens of successive sub-frames compose one frame. For example, 80 successive sub-frames compose one frame.

The prediction circuit 13D2 generates different prediction-error signals with respect to the calculation-result signal S2, that is, the calculation-result signal Lf–Rf. The prediction circuit 13D2 outputs the prediction-error signals to a buffer and selector 14D2. The prediction-error signals are temporarily stored in a memory within the buffer and selector 14D2. The selection signal/DTS generator 17 produces a second selection signal. The selection signal/DTS generator 17 outputs the second selection signal to the buffer and selector 14D2. The second selection signal is designed to select the smallest one from among the prediction-error signals in the memory of the buffer and selector 14D2 as an output signal of an optimum subtracter (an optimum predictor) for every sub-frame. Specifically, for every sub-frame, the selection signal/DTS generator 17 searches the memory within the buffer and selector 14D2 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal/DTS generator 17 enables the buffer and selector 14D2 to output the smallest prediction-error signal from the memory to the packing circuit 18 as the selected (Lf–Rf)-related prediction-error signal for every sub-frame.

The prediction circuit 13D3 generates different prediction-error signals with respect to the calculation-result signal S3, that is, the calculation-result signal C–(Ls+Rs)/2. The prediction circuit 13D3 outputs the prediction-error signals to a buffer and selector 14D3. The prediction-error signals are temporarily stored in a memory within the buffer and selector 14D3. The selection signal/DTS generator 17 produces a third selection signal. The selection signal/DTS generator 17 outputs the third selection signal to the buffer and selector 14D3. The third selection signal is designed to select the smallest one from among the prediction-error signals in the memory of the buffer and selector 14D3 as an output signal of an optimum subtracter (an optimum predictor) for every sub-frame. Specifically, for every sub-frame, the selection signal/DTS generator 17 searches the memory within the buffer and selector 14D3 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal/DTS generator 17 enables the buffer and selector 14D3 to output the smallest prediction-error signal from the memory to the packing circuit 18 as the selected (C−(Ls+Rs)/2)-related prediction-error signal for every sub-frame.

The prediction circuit 13D4 generates different prediction-error signals with respect to the calculation-result signal S4, that is, the calculation-result signal Ls+Rs. The prediction circuit 13D4 outputs the prediction-error signals to a buffer and selector 14D4. The prediction-error signals are temporarily stored in a memory within the buffer and selector 14D4. The selection signal/DTS generator 17 produces a fourth selection signal. The selection signal/DTS generator 17 outputs the fourth selection signal to the buffer and selector 14D4. The fourth selection signal is designed to select the smallest one from among the prediction-error signals in the memory of the buffer and selector 14D4 as an output signal of an optimum subtracter (an optimum predictor) for every sub-frame. Specifically, for every sub-frame, the selection signal/DTS generator 17 searches the memory within the buffer and selector 14D4 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal/DTS generator 17 enables the buffer and selector 14D4 to output the smallest prediction-error signal from the memory to the packing circuit 18 as the selected (Ls+Rs)-related prediction-error signal for every sub-frame.

The prediction circuit 13D5 generates different prediction-error signals with respect to the calculation-result signal S5, that is, the calculation-result signal Ls−Rs. The prediction circuit 13D5 outputs the prediction-error signals to a buffer and selector 14D5. The prediction-error signals are temporarily stored in a memory within the buffer and selector 14D5. The selection signal/DTS generator 17 produces a fifth selection signal. The selection signal/DTS generator 17 outputs the fifth selection signal to the buffer and selector 14D5. The fifth selection signal is designed to select the smallest one from among the prediction-error signals in the memory of the buffer and selector 14D5 as an output signal of an optimum subtracter (an optimum predictor) for every sub-frame. Specifically, for every sub-frame, the selection signal/DTS generator 17 searches the memory within the buffer and selector 14D5 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal/DTS generator 17 enables the buffer and selector 14D5 to output the smallest prediction-error signal from the memory to the packing circuit 18 as the selected (Ls−Rs)-related prediction-error signal for every sub-frame.

The prediction circuit 13D6 generates different prediction-error signals with respect to the calculation-result signal S6, that is, the calculation-result signal Lfe−a×C. The prediction circuit 13D6 outputs the prediction-error signals to a buffer and selector 14D6. The prediction-error signals are temporarily stored in a memory within the buffer and selector 14D6. The selection signal/DTS generator 17 produces a sixth selection signal. The selection signal/DTS generator 17 outputs the sixth selection signal to the buffer and selector 14D6. The sixth selection signal is designed to select the smallest one from among the prediction-error signals in the memory of the buffer and selector 14D6 as an output signal of an optimum subtracter (an optimum predictor) for every sub-frame. Specifically, for every sub-frame, the selection signal/DTS generator 17 searches the memory within the buffer and selector 14D6 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal/DTS generator 17 enables the buffer and selector 14D6 to output the smallest prediction-error signal from the memory to the packing circuit 18 as the selected (Lfe−a×C)-related prediction-error signal for every sub-frame.

The selection signal/DTS generator 17 produces a first flag representing the maximum number among the numbers of effective bits in respective samples of the selected (Lf+Rf)-related prediction-error signal which compose one sub-frame. For every sub-frame, the selection signal/DTS generator 17 outputs the first flag to the packing circuit 18 and the formatting circuit 19 as an (Lf+Rf)-related bit-number flag.

The selection signal/DTS generator 17 produces a second flag representing the maximum number among the numbers of effective bits in respective samples of the selected (Lf−Rf)-related prediction-error signal which compose one sub-frame. For every sub-frame, the selection signal/DTS generator 17 outputs the second flag to the packing circuit 18 and the formatting circuit 19 as an (Lf−Rf)-related bit-number flag.

The selection signal/DTS generator 17 produces a third flag representing the maximum number among the numbers of effective bits in respective samples of the selected (C−(Ls+Rs)/2)-related prediction-error signal which compose one sub-frame. For every sub-frame, the selection signal/DTS generator 17 outputs the third flag to the packing circuit 18 and the formatting circuit 19 as an (C−(Ls+Rs)/2)-related bit-number flag.

The selection signal/DTS generator 17 produces a fourth flag representing the maximum number among the numbers of effective bits in respective samples of the selected (Ls+Rs)-related prediction-error signal which compose one sub-frame. For every sub-frame, the selection signal/DTS generator 17 outputs the fourth flag to the packing circuit 18 and the formatting circuit 19 as an (Ls+Rs)-related bit-number flag.

The selection signal/DTS generator 17 produces a fifth flag representing the maximum number among the numbers of effective bits in respective samples of the selected (Ls−Rs)-related prediction-error signal which compose one sub-frame. For every sub-frame, the selection signal/DTS generator 17 outputs the fifth flag to the packing circuit 18 and the formatting circuit 19 as an (Ls−Rs)-related bit-number flag.

The selection signal/DTS generator 17 produces a sixth flag representing the maximum number among the numbers of effective bits in respective samples of the selected (Lfe–a×C)-related prediction-error signal which compose one sub-frame. For every sub-frame, the selection signal/DTS generator 17 outputs the sixth flag to the packing circuit 18 and the formatting circuit 19 as an (Lfe–a×C)-related bit-number flag.

For every sub-frame, the selection signal/DTS generator 17 produces a seventh flag representing the optimal predictor among the predictors 13a-1, 13a-2, ..., and 13a-n in the prediction circuit 13D1, that is, the predictor causing the selected (Lf+Rf)-related prediction-error signal. The selection signal/DTS generator 17 outputs the seventh flag to the formatting circuit 19 as an (Lf+Rf)-related predictor-selection flag.

For every sub-frame, the selection signal/DTS generator 17 produces an eighth flag representing the optimal predictor among the predictors in the prediction circuit 13D2, that is, the predictor causing the selected (Lf–Rf)-related prediction-error signal. The selection signal/DTS generator 17 outputs the eighth flag to the formatting circuit 19 as an (Lf–Rf)-related predictor-selection flag.

For every sub-frame, the selection signal/DTS generator 17 produces a ninth flag representing the optimal predictor among the predictors in the prediction circuit 13D3, that is, the predictor causing the selected (C–(Ls+Rs)/2)-related prediction-error signal. The selection signal/DTS generator 17 outputs the ninth flag to the formatting circuit 19 as an (C–(Ls+Rs)/2)-related predictor-selection flag.

For every sub-frame, the selection signal/DTS generator 17 produces a tenth flag representing the optimal predictor among the predictors in the prediction circuit 13D4, that is, the predictor causing the selected (Ls+Rs)-related prediction-error signal. The selection signal/DTS generator 17 outputs the tenth flag to the formatting circuit 19 as an (Ls+Rs)-related predictor-selection flag.

For every sub-frame, the selection signal/DTS generator 17 produces an eleventh flag representing the optimal predictor among the predictors in the prediction circuit 13D5, that is, the predictor causing the selected (Ls–Rs)-related prediction-error signal. The selection signal/DTS generator 17 outputs the eleventh flag to the formatting circuit 19 as an (Ls–Rs)-related predictor-selection flag.

For every sub-frame, the selection signal/DTS generator 17 produces a twelfth flag representing the optimal predictor among the predictors in the prediction circuit 13D6, that is, the predictor causing the selected (Lfe–a×C)-related prediction-error signal. The selection signal/DTS generator 17 outputs the twelfth flag to the formatting circuit 19 as an (Lfe–a×C)-related predictor-selection flag.

For every sub-frame, the packing circuit 18 packs each of samples of the selected (Lf+Rf)-related prediction-error signal into bits, the number of which is equal to the maximum bit number represented by the (Lf+Rf)-related bit-number flag. Thus, the packing circuit 18 implements compression of the selected (Lf+Rf)-related prediction-error signal. The packing circuit 18 outputs every packing-resultant sample of the selected (Lf+Rf)-related prediction-error signal to the formatting circuit 19.

For every sub-frame, the packing circuit 18 packs each of samples of the selected (Lf–Rf)-related prediction-error signal into bits, the number of which is equal to the maximum bit number represented by the (Lf–Rf)-related bit-number flag. Thus, the packing circuit 18 implements compression of the selected (Lf–Rf)-related prediction-error signal. The packing circuit 18 outputs every packing-resultant sample of the selected (Lf–Rf)-related prediction-error signal to the formatting circuit 19.

For every sub-frame, the packing circuit 18 packs each of samples of the selected (C–(Ls+Rs)/2)-related prediction-error signal into bits, the number of which is equal to the maximum bit number represented by the (C–(Ls+Rs)/2)-related bit-number flag. Thus, the packing circuit 18 implements compression of the selected (C–(Ls+Rs)/2)-related prediction-error signal. The packing circuit 18 outputs every packing-resultant sample of the selected (C–(Ls+Rs)/2)-related prediction-error signal to the formatting circuit 19.

For every sub-frame, the packing circuit 18 packs each of samples of the selected (Ls+Rs)-related prediction-error signal into bits, the number of which is equal to the maximum bit number represented by the (Ls+Rs)-related bit-number flag. Thus, the packing circuit 18 implements compression of the selected (Ls+Rs)-related prediction-error signal. The packing circuit 18 outputs every packing-resultant sample of the selected (Ls+Rs)-related prediction-error signal to the formatting circuit 19.

For every sub-frame, the packing circuit 18 packs each of samples of the selected (Ls–Rs)-related prediction-error signal into bits, the number of which is equal to the maximum bit number represented by the (Ls–Rs)-related bit-number flag. Thus, the packing circuit 18 implements compression of the selected (Ls–Rs)-related prediction-error signal. The packing circuit 18 outputs every packing-resultant sample of the selected (Ls–Rs)-related prediction-error signal to the formatting circuit 19.

For every sub-frame, the packing circuit 18 packs each of samples of the selected (Lfe–a×C)-related prediction-error signal into bits, the number of which is equal to the maximum bit number represented by the (Lfe–a×C)-related bit-number flag. Thus, the packing circuit 18 implements compression of the selected (Lfe–a×C)-related prediction-error signal. The packing circuit 18 outputs every packing-resultant sample of the selected (Lfe–a×C)-related prediction-error signal to the formatting circuit 19.

A signal generator 20 periodically produces a signal representing a frame header. The signal generator 20 outputs the frame-header signal to the formatting circuit 19. A signal representing the coefficient "a" is applied to the formatting circuit 19 from an external.

The formatting circuit 19 includes a multiplexer and a DVD-audio encoder. The multiplexer is followed by the DVD-audio encoder. The multiplexer provides operation of the formatting circuit 19 which will be indicated below.

The formatting circuit 19 receives the frame-header signal from the signal generator 20 for every frame. The formatting circuit 19 receives the first sample of the calculation-result signal Lf+Rf and the first sample of the calculation-result signal Lf–Rf from the buffer 10 for every frame. The formatting circuit 19 receives the (Lf+Rf)-related predictor-selection flag and the (Lf–Rf)-related predictor-selection flag from the selection signal/DTS generator 17 for every sub-frame. The formatting circuit 19 receives the (Lf+Rf)-related bit-number flag and the (Lf–Rf)-related bit-number flag from the selection signal/DTS generator 17 for every sub-frame. The formatting circuit 19 receives every packing-resultant sample of the selected (Lf+Rf)-related prediction-error signal and every packing-resultant sample of the selected (Lf–Rf)-related prediction-error signal from the packing circuit 18. The formatting circuit 19 multiplexes the received signals and flags into a first sub bit stream BS0 on a time sharing basis. The first sub bit stream BS0 represents a sequence of variable-bit-number frames.

Every frame of the first sub bit stream BS0 is designed as follows. A starting portion of the frame is occupied by the frame header. The frame header is successively followed by the first sample of the calculation-result signal Lf+Rf, the first sample of the calculation-result signal Lf−Rf, a set of the (Lf+Rf)-related predictor-selection flags, a set of the (Lf−Rf)-related predictor-selection flags, a set of the (Lf+Rf)-related bit-number flags, and a set of the (Lf−Rf)-related bit-number flags. A set of the (Lf−Rf)-related bit-number flags is successively followed by a 1-frame-corresponding set of the packing-resultant samples of the selected (Lf+Rf)-related prediction-error signal, and a 1-frame-corresponding set of the packing-resultant samples of the selected (Lf−Rf)-related prediction-error signal. Since plural sub-frames compose one frame and the number of bits of every packing-resultant sample varies from sub-frame to sub-frame, a 1-frame-corresponding set of the packing-resultant samples of the selected (Lf+Rf)-related prediction-error signal has a variable bit number. Also, a 1-frame-corresponding set of the packing-resultant samples of the selected (Lf−Rf)-related prediction-error signal has a variable bit number.

The formatting circuit 19 receives the signal representing the coefficient "a". The formatting circuit 19 receives the frame-header signal from the signal generator 20 for every frame. The formatting circuit 19 receives the first sample of the calculation-result signal C−(Ls+Rs)/2, the first sample of the calculation-result signal Ls+Rs, the first sample of the calculation-result signal Ls−Rs, and the first sample of the calculation-result signal Lfe−a×C from the buffer 10 for every frame. The formatting circuit 19 receives the (C−(Ls+Rs)/2)-related predictor-selection flag, the (Ls+Rs)-related predictor-selection flag, the (Ls−Rs)-related predictor-selection flag, and the (Lfe−a×C)-related predictor-selection flag from the selection signal/DTS generator 17 for every sub-frame. The formatting circuit 19 receives the (C−(Ls+Rs)/2)-related bit-number flag, the (Ls+Rs)-related bit-number flag, the (Ls−Rs)-related bit-number flag, and the (Lfe−a×C)-related bit-number flag from the selection signal/DTS generator 17 for every sub-frame. The formatting circuit 19 receives every packing-resultant sample of the selected (C−(Ls+Rs)/2)-related prediction-error signal, every packing-resultant sample of the selected (Ls+Rs)-related prediction-error signal, every packing-resultant sample of the selected (Ls−Rs)-related prediction-error signal, and every packing-resultant sample of the selected (Lfe−a×C)-related prediction-error signal from the packing circuit 18. The formatting circuit 19 multiplexes the received signals and flags into a second sub bit stream BS1 on a time sharing basis. The second sub bit stream BS1 represents a sequence of variable-bit-number frames.

Every frame of the second sub bit stream BS1 is designed as follows. A starting portion of the frame is occupied by the frame header. The frame header is successively followed by the signal of the coefficient "a", the first sample of the calculation-result signal C−(Ls+Rs)/2, the first sample of the calculation-result signal Ls+Rs, the first sample of the calculation-result signal Ls−Rs, the first sample of the calculation-result signal Lfe−a×C, a set of the (C−(Ls+Rs)/2)-related predictor-selection flags, a set of the (Ls+Rs)-related predictor-selection flags, a set of the (Ls−Rs)-related predictor-selection flags, a set of the (Lfe−a×C)-related predictor-selection flags, a set of the (C−(Ls+Rs)/2)-related bit-number flags, a set of the (Ls+Rs)-related bit-number flags, a set of the (Ls−Rs)-related bit-number flags, and a set of the (Lfe−a×C)-related bit-number flags. A set of the (Lfe−a×C)-related bit-number flags is successively followed by a 1-frame-corresponding set of the packing-resultant samples of the selected (C−(Ls+Rs)/2)-related prediction-error signal, a 1-frame-corresponding set of the packing-resultant samples of the selected (Ls+Rs)-related prediction-error signal, a 1-frame-corresponding set of the packing-resultant samples of the selected (Ls−Rs)-related prediction-error signal, and a 1-frame-corresponding set of the packing-resultant samples of the selected (Lfe−a×C)-related prediction-error signal. Since plural sub-frames compose one frame and the number of bits of every packing-resultant sample varies from sub-frame to sub-frame, a 1-frame-corresponding set of the packing-resultant samples of the selected (C−(Ls+Rs)/2)-related prediction-error signal has a variable bit number. Also, a 1-frame-corresponding set of the packing-resultant samples of the selected (Ls+Rs)-related prediction-error signal has a variable bit number. In addition, a 1-frame-corresponding set of the packing-resultant samples of the selected (Ls−Rs)-related prediction-error signal has a variable bit number. Furthermore, a 1-frame-corresponding set of the packing-resultant samples of the selected (Lfe−a×C)-related prediction-error signal has a variable bit number.

A signal representing the predetermined sampling frequency fs is applied to the formatting circuit 19 from an external. A signal representing the predetermined quantization bit number Qb is applied to the formatting circuit 19 from an external.

The selection signal/DTS generator 17 produces a decoding time stamp (a DTS) in response to, for example, the previously-mentioned bit-number flags. The DTS denotes every desired timing at which segments of data streams should be read out from an input buffer in a decoder side. The selection signal/DTS generator 17 informs the formatting circuit 19 of the DTS.

A PTS generator 17A produces a presentation time stamp (a PTS). The PTS denotes every desired timing at which audio data should be read out from an output buffer in a decoder side. The PTS generator 17A informs the formatting circuit 19 of the PTS.

The DVD-audio encoder in the formatting circuit 19 provides operation of the formatting circuit 19 which will be indicated below. The formatting circuit 19 combines the first sub bit stream BS0, the second sub bit stream BS1, the signal of the DTS, the signal of the PTS, the signal of the predetermined sampling frequency fs, and the signal of the predetermined quantization bit number Qb into a main bit stream being a DVD-audio-format signal. The formatting circuit 19 outputs the main bit stream, that is, the DVD-audio-format signal, to the transmission line 250 (see FIG. 1).

Figure 4:
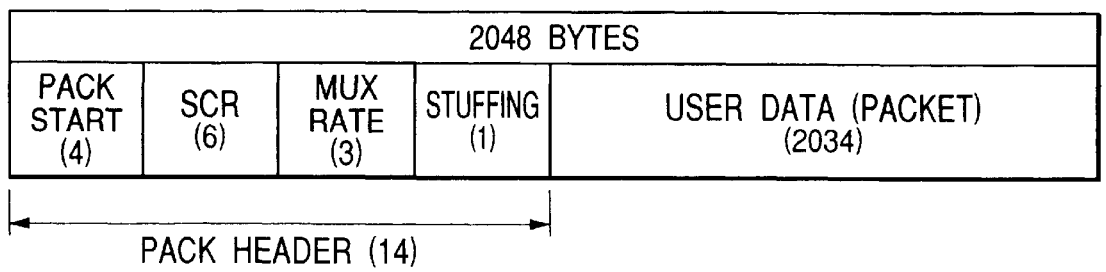
FIG. 4 is a diagram of a structure of an audio pack.

The DVD-audio-format signal generated by the formatting circuit 19 has a stream of packs including audio packs. As shown in FIG. 4, each audio pack has a sequence of 4-byte pack start information, 6-byte SCR (system clock reference) information, 3-byte mux rate information, 1-byte stuffing data, and 2,034-byte packet-form user data. Thus, each audio pack has 2,048 bytes. In each audio pack, pack start information, SCR information, mux rate information, and stuffing data compose a 14-byte pack header. SCR information in each audio pack serves as a time stamp. In each audio pack, 2,034-byte packet-form user data contains portions of the first sub bit stream BS0 and portions of the second sub bit stream BS1.

A time stamp (SCR information) in a first audio pack among audio packs related to one title is set to "1". Time stamps in second and later audio packs related to the same title are set to serial numbers "2", "3", "4", ..., respectively. The serially-numbered time stamps make it possible to manage times of audio packs related to the same title.

Figure 5:
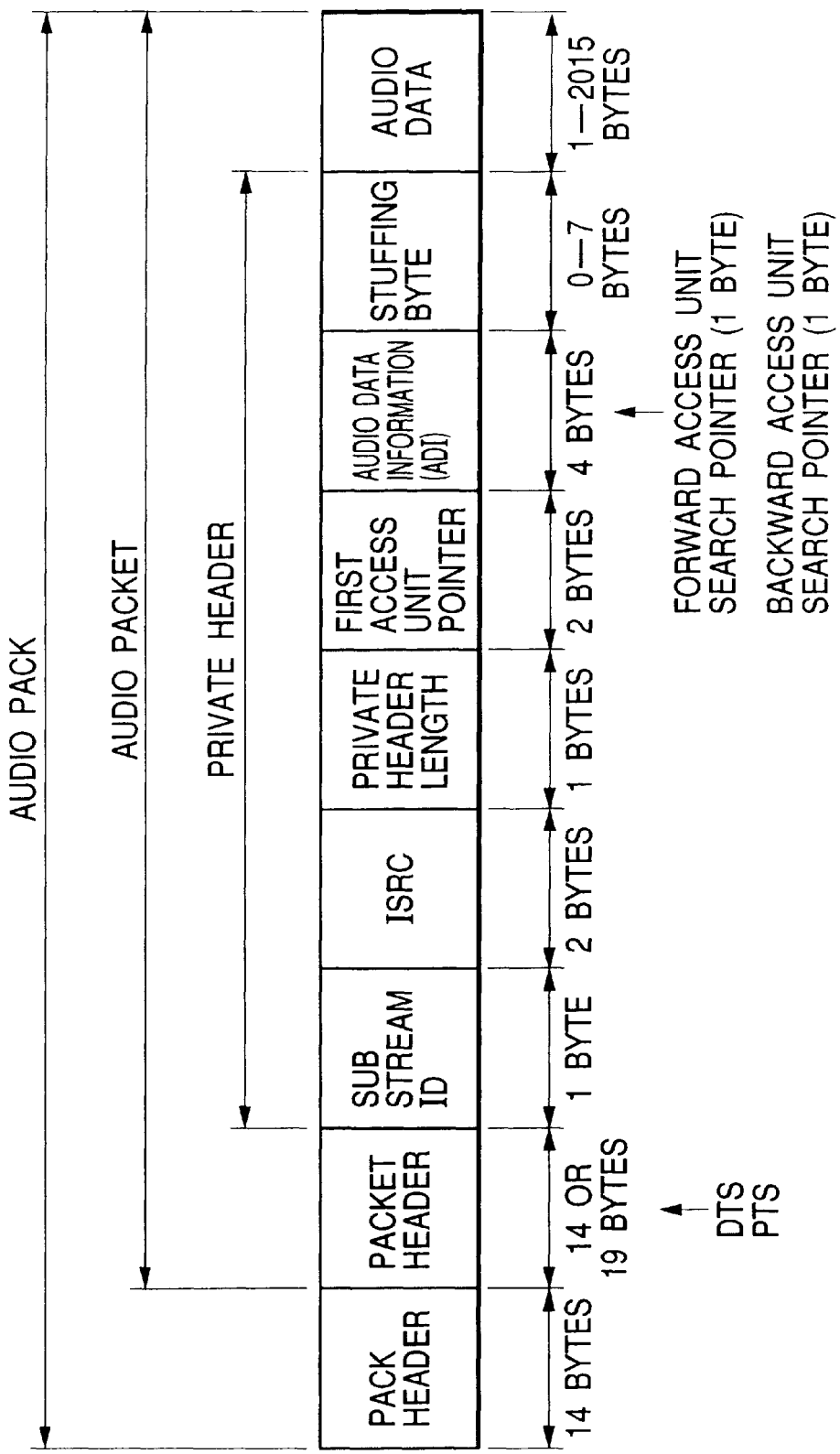
FIG. 5 is a diagram of the structure of the audio pack.

As shown in FIG. 5, one audio pack has a 14-byte or 19-byte pack header and an audio packet. The pack header is followed by the audio packet. The audio packet has a sequence of a packet header, a private header, and audio data (PCM audio data). Preferably, the packet header has 19 bytes. The 10-th byte to the 14-th byte in the packet header are loaded with the PTS. The 15-th byte to the 19-th byte in the packet header are loaded with the DTS. The packet header may have 14 bytes or another given number of bytes. The audio data has 1 byte to 2,015 bytes. The audio data contains portions of the first sub bit stream BS0 and portions of the second sub bit stream BS1.

As shown in FIG. 5, the private header has a sequence of 1-byte sub stream ID (identification) information, 2-byte information of an UPC/EAN-ISRC (Universal Product Code/European Article Number-International Standard Recording Code) number and UPC/EAN-ISRC data, 1-byte information of the private header length, a 2-byte first access unit pointer, 4-byte audio data information ADI, and 0 to 7 stuffing bytes.

The 1-st byte of the audio data information ADI represents a forward access unit search pointer to allow a search for a 1-second-after access unit. The 2-nd byte of the audio data information ADI represents a backward access unit search pointer to allow a search for a 1-second-before access unit.

Figure 6:
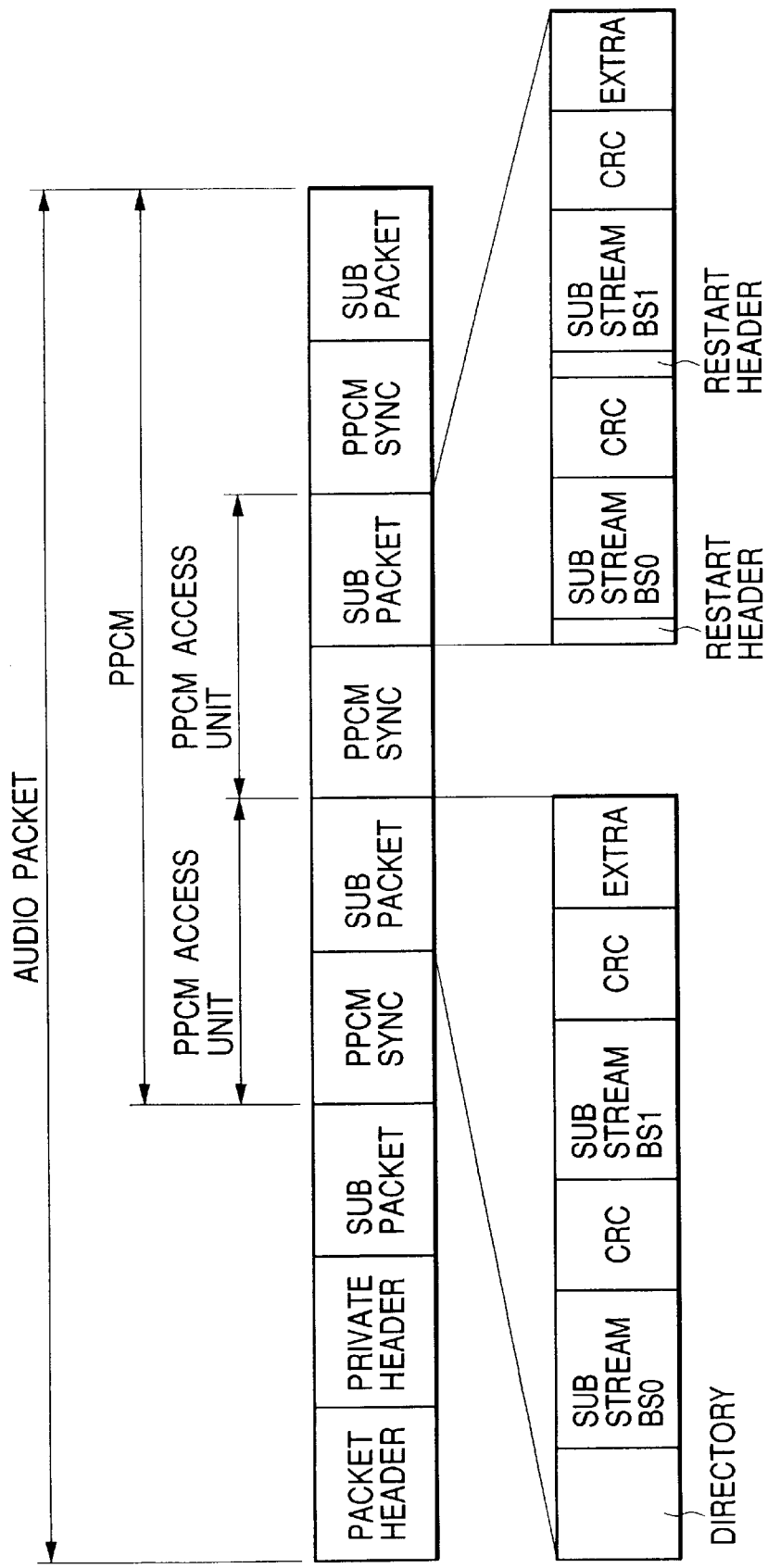
FIG. 6 is a diagram of a structure of an audio packet in FIG. 5.

As shown in FIG. 6, audio data in one audio packet has PPCM sync signals and sub packets. The PPCM sync signals alternate with the sub packets. Each PPCM sync signal and a following sub packet compose a PPCM access unit. The sub packet in the first PPCM access unit has a sequence of a directory signal, a portion of the first sub bit stream BS0, a CRC (cyclic redundancy check) signal, a portion of the second sub bit stream BS1, a CRC signal, and an extra information piece. The sub packet in each of the second and later PPCM access units has a sequence of a restart header, a portion of the first sub bit stream BS0, a CRC signal, a restart header, a portion of the second sub bit stream BS1, a CRC signal, and an extra information piece.

Each PPCM sync signal contains an information piece representing the number of samples per packet, an information piece representing a data rate, an information piece representing the predetermined sampling frequency fs, an information piece representing the predetermined quantization bit number Qb, an information piece representing channel assignment. The number of samples per packet is set to 40, 80, or 160 in accordance with the predetermined sampling frequency fs. The information piece representing the data rate is set to an identifier of "0" which denotes that audio data in the related sub packet is compressed data (compression-resultant data) with a variable bit rate.

Figure 7:
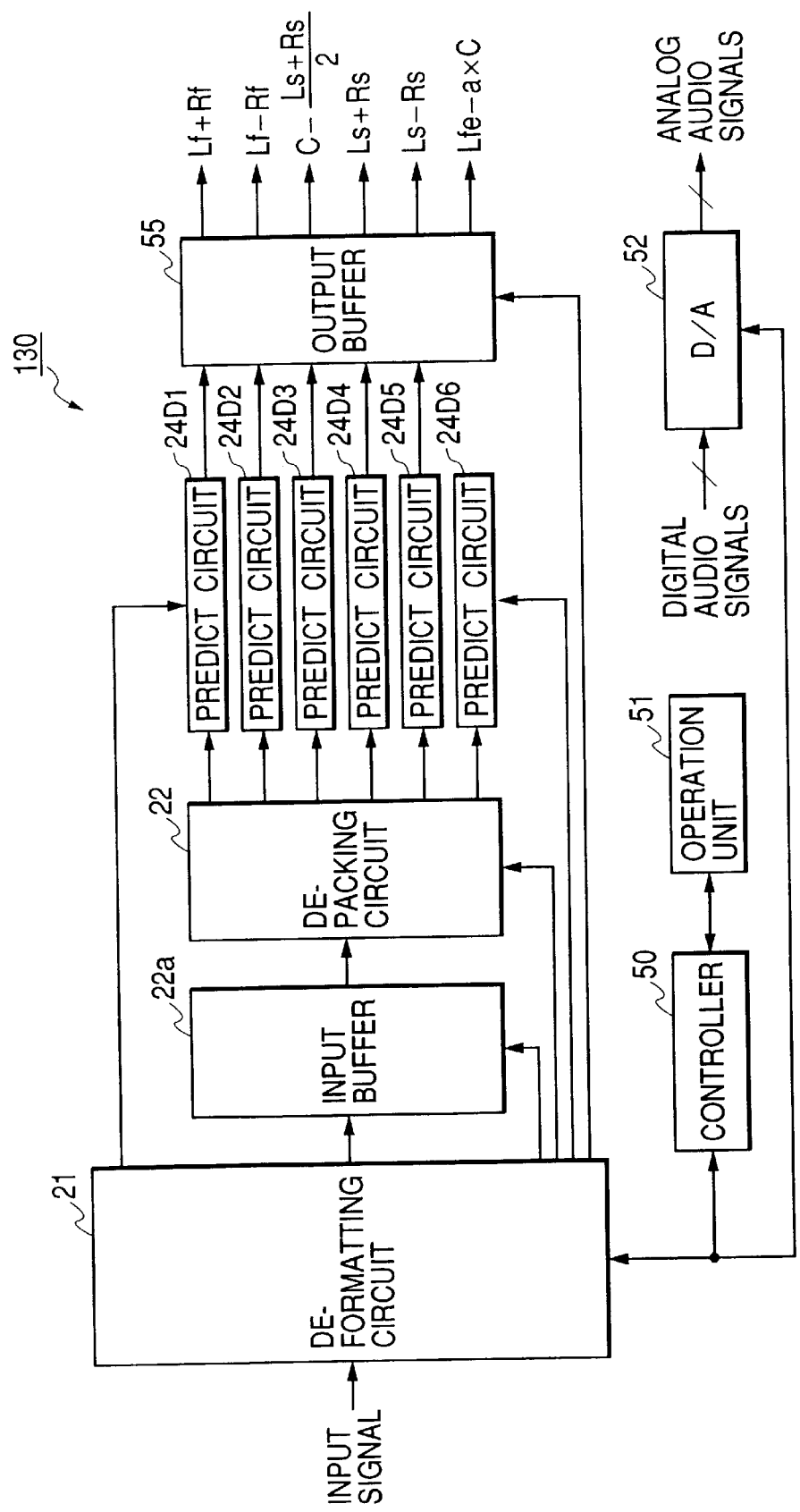
FIG. 7 is a block diagram of a decoder in FIG. 1.

As shown in FIG. 7, the decoder 130 includes a deformatting circuit 21 which receives the main bit stream, that is, the DVD-audio-format signal, from the transmission line 250 (see FIG. 1). The deformatting circuit 21 includes a DVD-audio decoder and a demultiplexer. The DVD-audio decoder is followed by the demultiplexer. The DVD-audio decoder provides operation of the deformatting circuit 21 which will be indicated below.

The deformatting circuit 21 first separates an audio packet from every audio pack, and separates the first sub bit stream BS0 and the second sub bit stream BS1 from the main bit stream (the DVD-audio-format signal). The deformatting circuit 21 separates the SCR information and the DTS signal from the main bit stream. The deformatting circuit 21 outputs the SCR information and the DTS signal to the input buffer 22a. The deformatting circuit 21 separates the PTS signal from the main bit stream. The deformatting circuit 21 outputs the PTS signal to an output buffer (an output memory) 55. The deformatting circuit 21 separates the data rate information (the data rate identifier) from the main bit stream. The deformatting circuit 21 outputs the data rate information to a controller 50. The deformatting circuit 21 separates the forward and backward access unit search pointers from the main bit stream. The deformatting circuit 21 informs the controller 50 of the forward and backward access unit pointers. The deformatting circuit 21 separates the signal of the predetermined sampling frequency fs and the signal of the predetermined quantization bit number Qb from the main bit stream. The deformatting circuit 21 outputs the signal of the predetermined sampling frequency fs and the predetermined bit number Qb to a digital-to-analog (D/A) converter 52.

The demultiplexer in the deformatting circuit 21 provides operation of the deformatting circuit 21 which will be indicated below. The deformatting circuit 21 detects every frame header in the first sub bit stream BS0. For every frame, the deformatting circuit 21 demultiplexes, in response to the detected frame header, the first sub bit stream BS0 into the first sample of the calculation-result signal Lf+Rf, the first sample of the calculation-result signal Lf−Rf, a set of the (Lf+Rf)-related predictor-selection flags, a set of the (Lf−Rf)-related predictor-selection flags, a set of the (Lf+Rf)-related bit-number flags, a set of the (Lf−Rf)-related bit-number flags, a 1-frame-corresponding set of the packing-resultant samples of the selected (Lf+Rf)-related prediction-error signal, and a 1-frame-corresponding set of the packing-resultant samples of the selected (Lf−Rf)-related prediction-error signal.

The deformatting circuit 21 outputs the first sample of the calculation-result signal Lf+Rf to a prediction circuit 24D1 for every frame. The deformatting circuit 21 outputs every (Lf+Rf)-related predictor-selection flag to the prediction circuit 24D1. The deformatting circuit 21 outputs the first sample of the calculation-result signal Lf−Rf to a prediction circuit 24D2 for every frame. The deformatting circuit 21 outputs every (Lf−Rf)-related predictor-selection flag to the prediction circuit 24D2. The deformatting circuit 21 outputs every (Lf+Rf)-related bit-number flag and every (Lf−Rf)-related bit-number flag to a de-packing circuit 22. The deformatting circuit 21 outputs every packing-resultant sample of the selected (Lf+Rf)-related prediction-error signal, and every packing-resultant sample of the selected (Lf−Rf)-related prediction-error signal to the input buffer 22a.

The deformatting circuit 21 detects every frame header in the second sub bit stream BS1. For every frame, the deformatting circuit 21 demultiplexes, in response to the detected frame header, the second sub bit stream BS1 into the signal of the coefficient "a", the first sample of the calculation-result signal C−(Ls+Rs)/2, the first sample of the calculation-result signal Ls+Rs, the first sample of the calculation-result signal Ls−Rs, the first sample of the calculation-result signal Lfe−a×C, a set of the (C−(Ls+Rs)/2)-related predictor-selection flags, a set of the (Ls+Rs)-related predictor-selection flags, a set of the (Ls−Rs)-related predictor-selection flags, a set of the (Lfe−a×C)-related predictor-selection flags, a set of the (C−(Ls+Rs)/2)-related bit-number flags, a set of the (Ls+Rs)-related bit-number flags, a set of the (Ls−Rs)-related bit-number flags, a set of the (Lfe−a×C)-related bit-number flags, a 1-frame-corresponding set of the packing-resultant samples of the selected (C−(Ls+Rs)/2)-related prediction-error signal, a 1-frame-corresponding set of the packing-resultant samples of the selected (Ls+Rs)-related prediction-error signal, a 1-frame-corresponding set of the packing-resultant samples of the selected (Ls−Rs)-related prediction-error signal, and a 1-frame-corresponding set of the packing-resultant samples of the selected (Lfe−a×C)-related prediction-error signal.

The deformatting circuit 21 outputs the signal of the coefficient "a" to the mix and matrix circuit 140 (see FIG. 1). The deformatting circuit 21 outputs the first sample of the calculation-result signal C−(Ls+Rs)/2 to a prediction circuit 24D3 for every frame. The deformatting circuit 21 outputs every (C−(Ls+Rs)/2)-related predictor-selection flag to the prediction circuit 24D3. The deformatting circuit 21 outputs the first sample of the calculation-result signal Ls+Rs to a prediction circuit 24D4 for every frame. The deformatting circuit 21 outputs every (Ls+Rs)-related predictor-selection flag to the prediction circuit 24D4. The deformatting circuit 21 outputs the first sample of the calculation-result signal Ls−Rs to a prediction circuit 24D5 for every frame. The deformatting circuit 21 outputs every (Ls−Rs)-related predictor-selection flag to the prediction circuit 24D5. The deformatting circuit 21 outputs the first sample of the calculation-result signal Lfe−a×C to a prediction circuit 24D6 for every frame. The deformatting circuit 21 outputs every (Lfe−a×C)-related predictor-selection flag to the prediction circuit 24D6. The deformatting circuit 21 outputs every (C−(Ls+Rs)/2)-related bit-number flag, every (Ls+Rs)-related bit-number flag, every (Ls−Rs)-related bit-number flag, and every (Lfe−a×C)-related bit-number flag to the de-packing circuit 22. The deformatting circuit 21 outputs every packing-resultant sample of the selected (C−(Ls+Rs)/2)-related prediction-error signal, every packing-resultant sample of the selected (Ls+Rs)-related prediction-error signal, every packing-resultant sample of the selected (Ls−Rs)-related prediction-error signal, and every packing-resultant sample of the selected (Lfe−a×C)-related prediction-error signal to the input buffer 22a.

Figure 8:
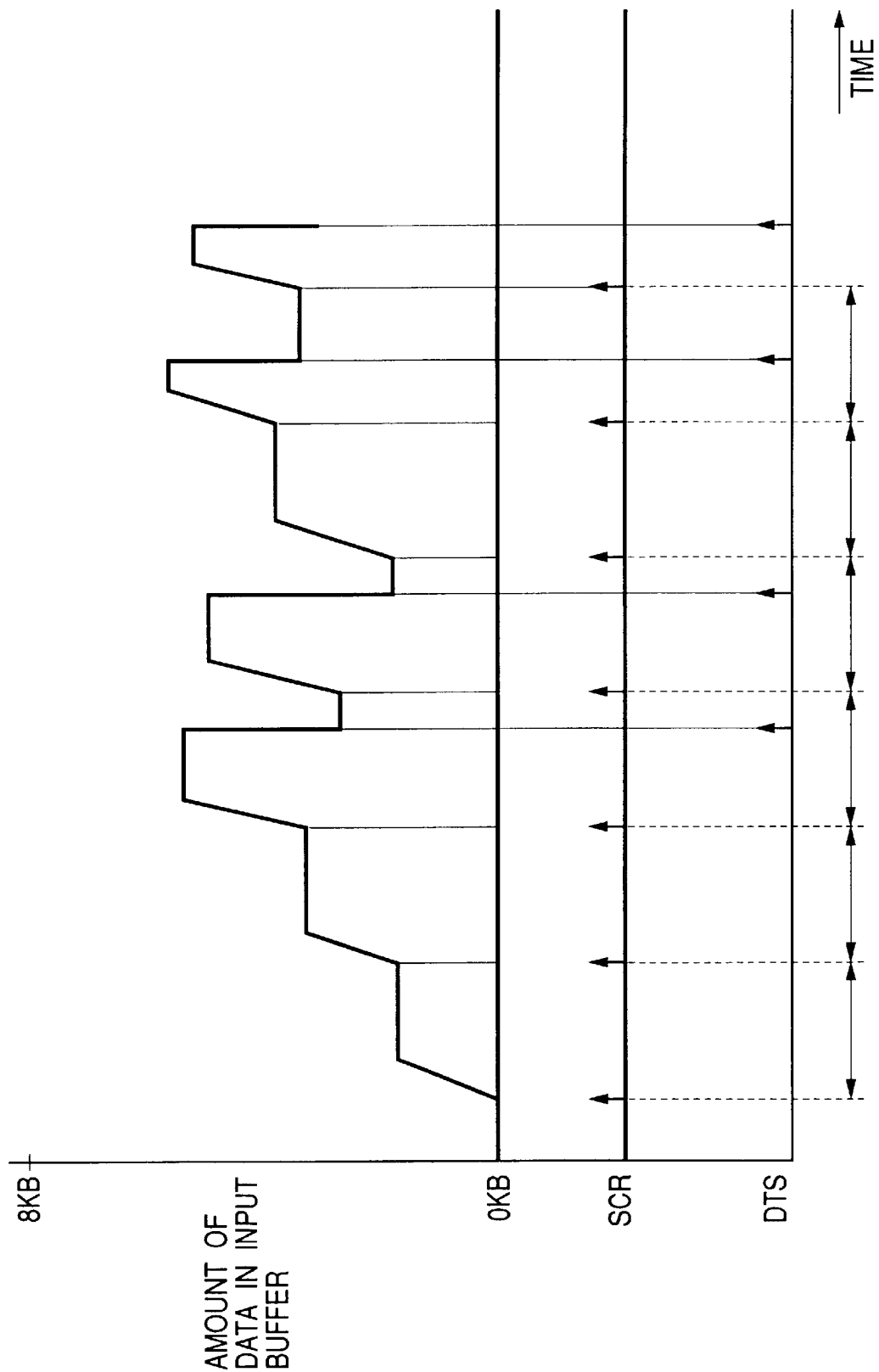
FIG. 8 is a time-domain diagram of the amount of data in an input buffer, a SCR signal, and a DTS signal.
Figure 9:
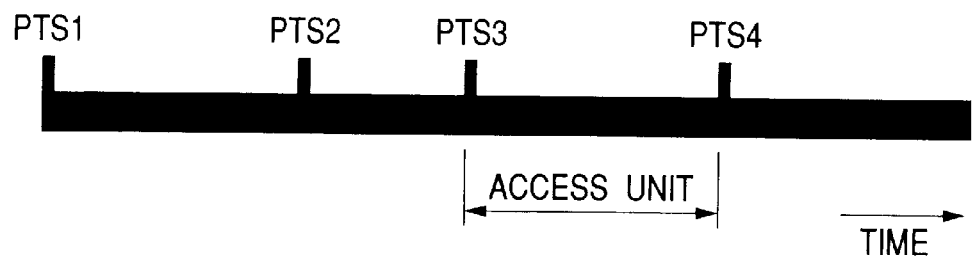
FIG. 9 is a time-domain diagram of a PTS signal.
Figure 10:
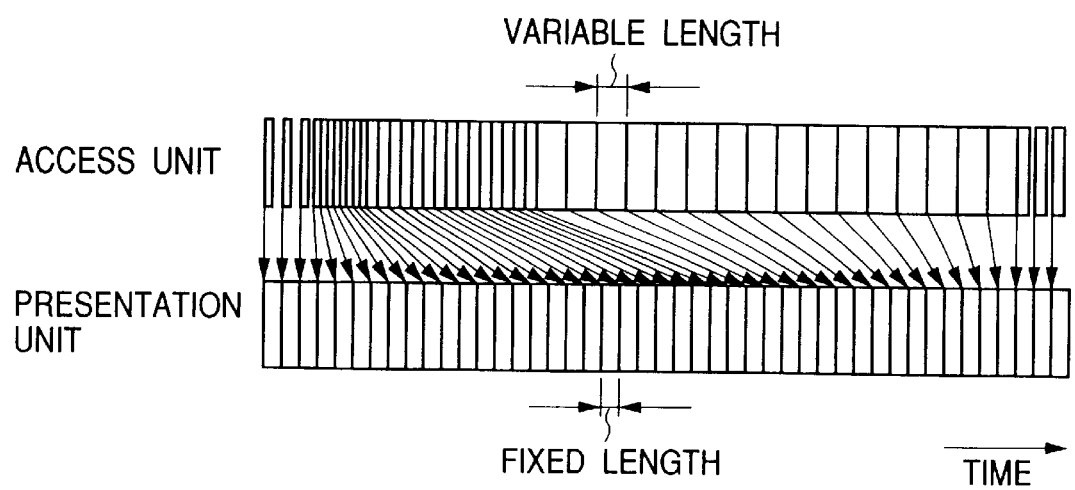
FIG. 10 is a time-domain diagram of a sequence of access units and a sequence of presentation units.

As shown in FIG. 8, the selected (Lf+Rf)-related prediction-error signal, the selected (Lf−Rf)-related prediction-error signal, the selected (C−(Ls+Rs)/2)-related prediction-error signal, the selected (Ls+Rs)-related prediction-error signal, the selected (Ls−Rs)-related prediction-error signal, and the selected (Lfe−a×C)-related prediction-error signal are stored into the input buffer 22a in response to the SCR information for every access unit. As shown in FIGS. 9 and 10, access units are variable in bit length. As shown in FIG. 8, the selected (Lf+Rf)-related prediction-error signal, the selected (Lf−Rf)-related prediction-error signal, the selected (C−(Ls+Rs)/2)-related prediction-error signal, the selected (Ls+Rs)-related prediction-error signal, the selected (Ls−Rs)-related prediction-error signal, and the selected (Lfe−a×C)-related prediction-error signal are read out from the input buffer 22a in response to the DTS signal before being fed to the de-packing circuit 22. The input buffer 22a serves as a FIFO memory.

For every sub-frame, the de-packing circuit 22 implements the unpacking (expansion) of the packing-resultant samples of the selected (Lf+Rf)-related prediction-error signal in response to the (Lf+Rf)-related bit-number flag. The de-packing circuit 22 outputs the resultant (Lf+Rf)-related prediction-error signal to the prediction circuit 24D1. For every sub-frame, the de-packing circuit 22 implements the unpacking (expansion) of the packing-resultant samples of the selected (Lf−Rf)-related prediction-error signal in response to the (Lf−Rf)-related bit-number flag. The de-packing circuit 22 outputs the resultant (Lf−Rf)-related prediction-error signal to the prediction circuit 24D2. For every sub-frame, the de-packing circuit 22 implements the unpacking (expansion) of the packing-resultant samples of the selected (C−(Ls+Rs)/2)-related prediction-error signal in response to the (C−(Ls+Rs)/2)-related bit-number flag. The de-packing circuit 22 outputs the resultant (C−(Ls+Rs)/2)-related prediction-error signal to the prediction circuit 24D3. For every sub-frame, the de-packing circuit 22 implements the unpacking (expansion) of the packing-resultant samples of the selected (Ls+Rs)-related prediction-error signal in response to the (Ls+Rs)-related bit-number flag. The de-packing circuit 22 outputs the resultant (Ls+Rs)-related prediction-error signal to the prediction circuit 24D4. For every sub-frame, the de-packing circuit 22 implements the unpacking (expansion) of the packing-resultant samples of the selected (Ls−Rs)-related prediction-error signal in response to the (Ls−Rs)-related bit-number flag. The de-packing circuit 22 outputs the resultant (Ls−Rs)-related prediction-error signal to the prediction circuit 24D5. For every sub-frame, the de-packing circuit 22 implements the unpacking (expansion) of the packing-resultant samples of the selected (Lfe−a×C)-related prediction-error signal in response to the (Lfe−a×C)-related bit-number flag. The de-packing circuit 22 outputs the resultant (Lfe−a×C)-related prediction-error signal to the prediction circuit 24D6.

Operation of the prediction circuit 24D1 is inverse with respect to operation of the prediction circuit 13D1 in the encoder 120 (see FIG. 2). The prediction circuit 24D1 includes an adder which receives the (Lf+Rf)-related prediction-error signal. Also, the prediction circuit 24D1 includes predictors which have the same characteristics as those of the predictors 13a-1, 13a-2, . . . , and 13a-n in the prediction circuit 13D1, respectively. For every sub-frame, one of the predictors in the prediction circuit 24D1 is selected in response to the (Lf+Rf)-related predictor-selection flag. Specifically, one of the predictors is selected which has the same characteristic as the encoder-side predictor used for the sub-frame of interest. The selected predictor generates a prediction-result signal in response to an output signal of the adder. The selected predictor is enabled to output the prediction-result signal to the adder. The adder combines the (Lf+Rf)-related prediction-error signal and the prediction-result signal into an (Lf+Rf)-related addition-result signal. The adder outputs the (Lf+Rf)-related addition-result signal to the predictors. At a start of every frame, the (Lf+Rf)-related addition-result signal is initialized to the the first sample of the calculation-result signal Lf+Rf. Then, the (Lf+Rf)-related addition-result signal is updated sample by sample. A sequence of resultant samples of the (Lf+Rf)-related addition-result signal is a sequence of samples of a reproduced signal corresponding to the calculation-result signal Lf+Rf outputted from the mix and matrix circuit 110 in the audio signal encoding apparatus 100 (see FIG. 1). The prediction circuit 24D1 outputs the reproduced calculation-result signal Lf+Rf to the output buffer 55. The prediction circuits 24D2, 24D3, 24D4, 24D5, and 24D6 are similar in structure to the prediction circuit 24D1. The prediction circuits 24D2, 24D3, 24D4, 24D5, and 24D6 operate similarly to the operation of the prediction circuit 24D1. The prediction circuit 24D2 reproduces the calculation-result signal Lf−Rf. The prediction circuit 24D2 outputs the reproduced calculation-result signal Lf−Rf to the output buffer 55. The prediction circuit 24D3 reproduces the calculation-result signal C−(Ls+Rs)/2. The prediction circuit 24D3 outputs the reproduced calculation-result signal C−(Ls+Rs)/2 to the output buffer 55. The prediction circuit 24D4 reproduces the calculation-result signal Ls+Rs. The prediction circuit 24D4 outputs the reproduced calculation-result signal Ls+Rs to the output buffer 55. The prediction circuit 24D5 reproduces the calculation-result signal Ls–Rs. The prediction circuit 24D5 outputs the reproduced calculation-result signal Ls–Rs to the output buffer 55. The prediction circuit 24D6 reproduces the calculation-result signal Lfe–a×C. The prediction circuit 24D6 outputs the reproduced calculation-result signal Lfe–a×C to the output buffer 55.

The reproduced calculation-result signal Lf+Rf, the reproduced calculation-result signal Lf–Rf, the reproduced calculation-result signal C–(Ls+Rs)/2, the reproduced calculation-result signal Ls+Rs, the reproduced calculation-result signal Ls–Rs, and the calculation-result signal Lfe–a×C are stored into the output buffer 55. The reproduced calculation-result signal Lf+Rf, the reproduced calculation-result signal Lf–Rf, the reproduced calculation-result signal C–(Ls+Rs)/2, the reproduced calculation-result signal Ls+Rs, the reproduced calculation-result signal Ls–Rs, and the calculation-result signal Lfe–a×C are read out from the output buffer 55 in response to the PTS signal before being fed to the mix and matrix circuit 140 (see FIG. 1). Accordingly, the reproduced calculation-result signal Lf+Rf, the reproduced calculation-result signal Lf–Rf, the reproduced calculation-result signal C–(Ls+Rs)/2, the reproduced calculation-result signal Ls+Rs, the reproduced calculation-result signal Ls–Rs, and the calculation-result signal Lfe–a×C are read out from the output buffer 55 presentation-unit by presentation-unit. Thus, as shown in FIG. 10, access units are changed into presentation units which are fixed in bit length.

Operation of a first portion of the mix and matrix circuit 140 is inverse with respect to the operation of the mix and matrix circuit 110 in the audio signal encoding apparatus 100. The first portion of the mix and matrix circuit 140 converts a set of the reproduced calculation-result signal Lf+Rf, the reproduced calculation-result signal Lf–Rf, the reproduced calculation-result signal C–(Ls+Rs)/2, the reproduced calculation-result signal Ls+Rs, the reproduced calculation-result signal Ls–Rs, and the calculation-result signal Lfe–a×C into a set of a reproduced left-front digital audio signal Lf, a reproduced right-front digital audio signal Rf, a center digital audio signal C, a reproduced left-surround digital audio signal Ls, a reproduced right-surround digital audio signal Rs, and a reproduced low-frequency-effect digital audio signal Lfe. The first portion of the mix and matrix circuit 140 outputs the 6-channel reproduced digital audio signals Lf, Rf, C, Ls, Rs, and Lfe to the D/A converter 52 (see FIG. 7) or an external device (not shown). The mix and matrix circuit 140 uses the signal of the coefficient "a" in generating the reproduced low-frequency-effect digital audio signal Lfe.

A second portion of the mix and matrix circuit 140 includes multipliers and adders designed and connected to mix the 6-channel reproduced digital audio signals Lf, Rf, C, Ls, Rs, and Lfe into a left-channel digital audio signal L and a right-channel digital audio signal R according to equations as follows.

$$L = m11 \cdot Lf + m12 \cdot Rf + m13 \cdot C + m14 \cdot Ls + m15 \cdot Rs + m16 \cdot Lfe$$

$$R = m21 \cdot Lf + m22 \cdot Rf + m23 \cdot C + m24 \cdot Ls + m25 \cdot Rs + m26 \cdot Lfe$$

where m11–m16 and m21–m26 denote predetermined mixing coefficients. The second portion of the mix and matrix circuit 140 outputs the left-channel digital audio signal L and the right-channel digital audio signal R to the D/A converter 52 (see FIG. 7) or an external device (not shown).

The D/A converter 52 changes the 6-channel reproduced digital audio signals Lf, Rf, C, Ls, Rs, and Lfe into corresponding 6-channel analog audio signals in response to the predetermined sampling frequency fs and the predetermined quantization bit number Qb. The D/A converter 52 outputs the 6-channel analog audio signals to external devices (not shown). In addition, the D/A converter 52 changes the left-channel digital audio signal L and the right-channel digital audio signal R into corresponding 2-channel analog audio signals in response to the signal of the predetermined sampling frequency fs and the signal of the predetermined quantization bit number Qb. The D/A converter 52 outputs the 2-channel analog audio signals to external devices (not shown).

The controller 50 is connected to an operation unit 51. When a command for search playback is inputted into the controller 50 via the operation unit 51, the controller 50 acts to implement the playback of data from a desired access unit in response to the forward access unit search pointer or the backward access unit search pointer.

Preferably, the device 50 controls the de-packing circuit 22 in response to the data rate identifier. When the data rate identifier denotes that audio data in the related sub packet is compressed data (compression-resultant data), the controller 50 enables the de-packing circuit 22 to implement the desired data expansion process.

An fs conversion circuit may precede the mix and matrix circuit 110. The fs conversion circuit is the same as an fs conversion circuit 109 in a sixth embodiment of this invention which will be explained later.

Second Embodiment

A second embodiment of this invention is similar to the first embodiment thereof except for design changes mentioned later.

Figure 11:
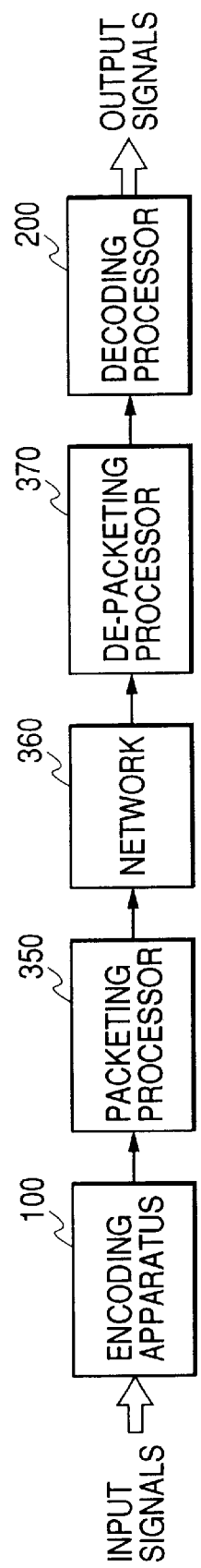
FIG. 11 is a block diagram of a system according to a second embodiment of this invention.

With reference to FIG. 11, the second embodiment of this invention includes a packeting processor 350 which follows the audio signal encoding apparatus 100. The packeting processor 350 encodes the output signal of the audio signal encoding apparatus (that is, the main bit stream) into a packet stream. The packeting processor 350 transmits the packet stream to a communication network (or a communication line) 360.

A de-packeting processor 370 receives the packet stream from the communication network 360. The de-packeting processor 370 decodes the packet stream into the main bit stream. The de-packeting processor 370 outputs the main bit stream to the audio signal decoding apparatus 200.

The packeting processor 350 operates in accordance with a control program stored in its internal ROM or another memory. FIG. 12 is a flowchart of a segment of the control program. As shown in FIG. 12, a first step S41 of the program segment divides the main bit stream into basic packets each having a predetermined number of bits. A step S42 following the step S41 adds headers to the starting ends of the basic packets to change the basic packets to final packets respectively. Generally, the added headers include destination addresses. A step S43 subsequent to the step S42 sequentially transmits the final packets to the communication network 360.

The de-packeting processor 370 operates in accordance with a control program stored in its internal ROM or another memory. FIG. 13 is a flowchart of a segment of the control program. As shown in FIG. 13, a first step S51 of the program segment removes headers from received packets. A step S52 following the step S51 recovers the main bit stream from the header-less packets. A step S53 subsequent to the step S52 stores the recovered main bit stream into a buffer memory provided in the de-packeting processor 370. The main bit stream is transmitted from the buffer memory to the audio signal decoding apparatus 200.

Third Embodiment

A third embodiment of this invention is similar to the first embodiment thereof except for design changes indicated hereinafter. In the third embodiment of this invention, an audio signal encoding apparatus includes a down mixing circuit which converts a set of 6-channel input digital audio signals Lf, Rf, C, Ls, Rs, and Lfe into a pair of a left-channel digital audio signal L and a right-channel digital audio signal R as the mix and matrix circuit 140 in the first embodiment of this invention does. A mix and matrix circuit following the down mixing circuit converts a set of the digital audio signals L, R, C, Ls, Rs, and Lfe into a set of a calculation-result signal L+R, a calculation-result signal L−R, a calculation-result signal C−(Ls+Rs)/2, a calculation-result signal Ls+Rs, a calculation-result signal Ls−Rs, and a calculation-result signal Lfe−C. The calculation-result signals L+R, L−R, C−(Ls+Rs)/2, Ls+Rs, Ls−Rs, and Lfe−C are encoded as the calculation-result signals Lf+Rf, Lf−Rf, C−(Ls+Rs)/2, Ls+Rs, Ls−Rs, and Lfe−a×C are encoded in the first embodiment of this invention.

The calculation-result signals L+R, L−R, C−(Ls+Rs)/2, Ls+Rs, Ls−Rs, and Lfe−C are reproduced by a decoding process as the calculation-result signals Lf+Rf, Lf−Rf, C−(Ls+Rs)/2, Ls+Rs, Ls−Rs, and Lfe−a×C are reproduced in the first embodiment of this invention. The left-channel digital audio signal L is recovered by adding the reproduced calculation-result signal L+R and the reproduced calculation-result signal L−R. The right-channel digital audio signal R is recovered by subtracting the reproduced calculation-result signal L−R from the reproduced calculation-result signal L+R.

Fourth Embodiment

FIG. 14 shows a fourth embodiment of this invention which is similar to the first embodiment thereof except for design changes indicated hereinafter. The fourth embodiment of this invention includes mix and matrix circuits 110A and 140A instead of the mix and matrix circuits 110 and 140 in the first embodiment of this invention.

The mix and matrix circuit 110A includes a down mixing circuit which converts a set of 6-channel input digital audio signals Lf, Rf, C, Ls, Rs, and Lfe into a pair of a left-channel digital audio signal L and a right-channel digital audio signal R as the mix and matrix circuit 140 in the first embodiment of this invention does. The mix and matrix circuit 110A outputs the left-channel digital audio signal L and the right-channel digital audio signal R to an encoder 120.

The mix and matrix circuit 110A converts a set of the input digital audio signals C, Ls, Rs, and Lfe into a set of a calculation-result signal C−(Ls+Rs)/2, a calculation-result signal Ls+Rs, a calculation-result signal Ls−Rs, and a calculation-result signal Lfe−C. The mix and matrix circuit 110A outputs the calculation-result signals C−(Ls+Rs)/2, Ls+Rs, Ls−Rs, and Lfe−C to the encoder 120.

The digital audio signals L, R, C−(Ls+Rs)/2, Ls+Rs, Ls−Rs, and Lfe−C are encoded by the device 120 as the calculation-result signals Lf+Rf, Lf−Rf, C−(Ls+Rs)/2, Ls+Rs, Ls−Rs, and Lfe−a×C are encoded in the first embodiment of this invention. In this case, the digital audio signals L and R are stored in a portion of the first sub bit steam BS0 shown in FIG. 6, and the other audio signals C−(Ls+Rs)/2, Ls+Rs, Ls−Rs, and Lfe−C are stored in a portion of the second sub bit stream BS1 shown in FIG. 6.

In the fourth embodiment of this invention, a decoder 130 reproduces the digital audio signals L, R, C−(Ls+Rs)/2, Ls+Rs, Ls−Rs, and Lfe−C. The decoder 130 outputs the reproduced digital audio signals L, R, C−(Ls+Rs)/2, Ls+Rs, Ls−Rs, and Lfe−C to the mix and matrix circuit 140A.

The mix and matrix circuit 140A converts a set of the reproduced digital audio signals C−(Ls+Rs)/2, Ls+Rs, Ls−Rs, and Lfe−C into a set of the reproduced digital audio signals C, Ls, Rs, and Lfe. The mix and matrix circuit 140A outputs the reproduced digital audio signals C, Ls, Rs, and Lfe.

The mix and matrix circuit 140A reproduces the digital audio signals Lf and Rf by suitably combining the reproduced digital audio signals L, R, C, Ls, Rs, and Lfe. The mix and matrix circuit 140A outputs the reproduced digital audio signals Lf and Rf. In addition, the mix and matrix circuit 140A outputs the reproduced digital audio signals L and R. In this embodiment, if users want to reproduce only the digital audio signal L and the digital audio signal R without other channels, the signal processing by the mix and matrix circuit 140A can be simpler.

Fifth Embodiment

A fifth embodiment of this invention is similar to the first embodiment thereof except for design changes indicated hereinafter.

Figure 15:
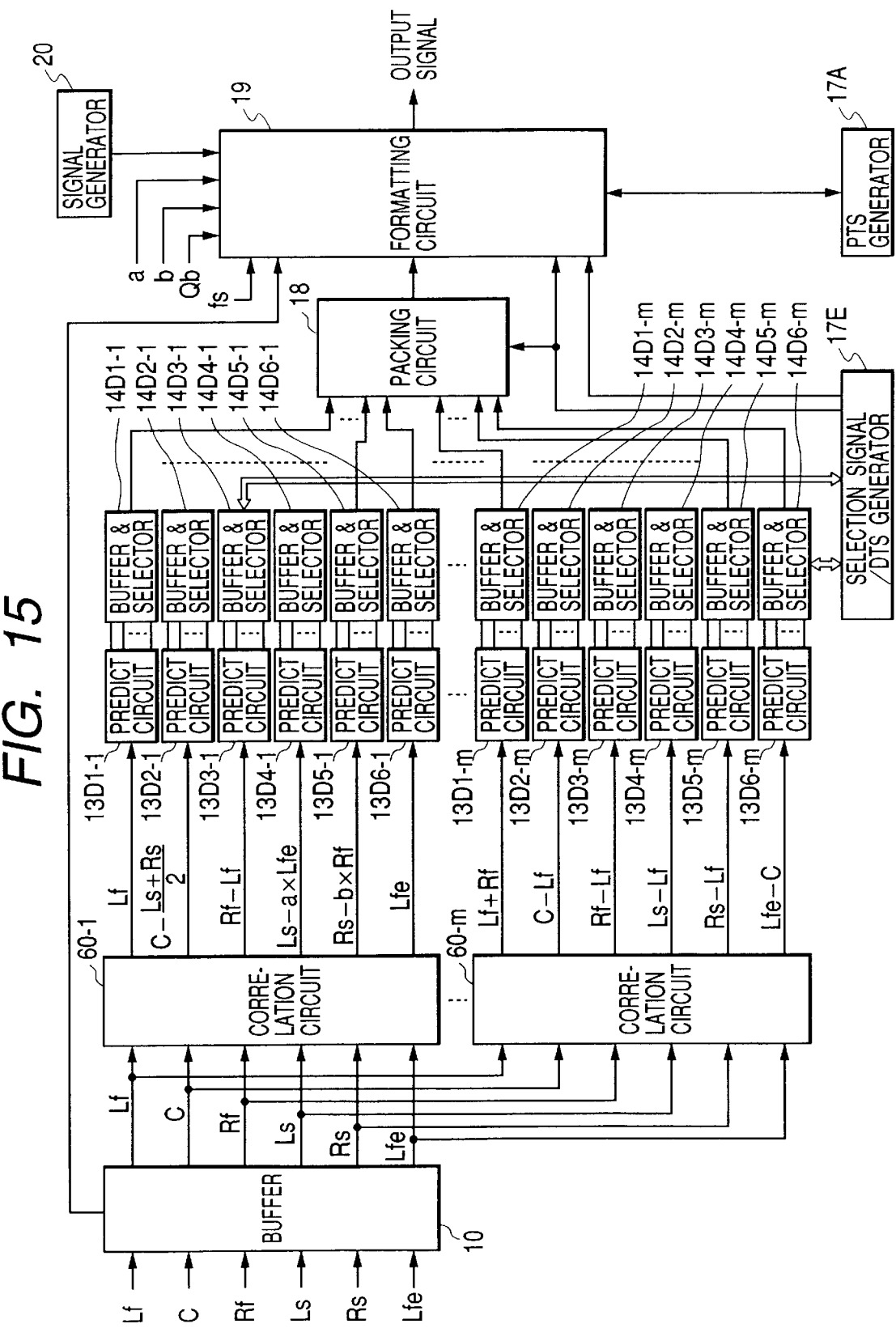
FIG. 15 is a block diagram of an audio signal encoding apparatus in a system according to a fifth embodiment of this invention.

FIG. 15 shows an audio signal encoding apparatus in the fifth embodiment of this invention. The audio signal encoding apparatus of FIG. 15 processes 6-channel input digital audio signals Lf, C, Rf, Ls, Rs, and Lfe.

The audio signal encoding apparatus of FIG. 15 includes a buffer 10. The digital audio signals Lf, C, Rf, Ls, Rs, and Lfe are stored into the buffer 10 frame by frame. The digital audio signals Lf, C, Rf, Ls, Rs, and Lfe are transmitted from the buffer 10 to each of "m" correlation circuits 60-1, . . . , and 60-m. For every frame, the first samples of the digital audio signals Lf, C, Rf, Ls, Rs, and Lfe are transmitted from the buffer 10 to a formatting circuit 19.

Each of the correlation circuits 60-1, . . . , and 60-m converts a set of the digital audio signals Lf, C, Rf, Ls, Rs, and Lfe into a set of 6 calculation-result signals by a mixing process. The mixing processes by the correlation circuits 60-1, . . . , and 60-m are different from each other.

For example, the 1-st correlation circuit 60-1 converts a set of the digital audio signals Lf, C, Rf, Ls, Rs, and Lfe into a set of 6 calculation-result signals Lf, C−(Ls+Rs)/2, Rf−Lf, Ls−a×Lfe, Rs−b×Rf, and Lfe where "a" and "b" denote fixed or variable coefficients in the range between 0 and 1. For example, the m-th correlation circuit 60-m converts a set of the digital audio signals Lf, C, Rf, Ls, Rs, and Lfe into a set of 6 calculation-result signals Lf+Rf, C−Lf, Rf−Lf, Ls−Lf, Rs−Lf, and Lfe−C.

Each of the correlation circuits 60-1, . . . , and 60-m outputs the 6 calculation-result signals to 6 different prediction circuits respectively. The 6 different prediction circuits are followed by 6 buffer and selectors respectively.

For example, the 1-st correlation circuit 60-1 outputs the calculation-result signals Lf, C−(Ls+Rs)/2, Rf−Lf, Ls−a× Lfe, Rs−b×Rf, and Lfe to prediction circuits 13D1-1, 13D2-1, 13D3-1, 13D4-1, 13D5-1, and 13D6-1 respectively. The prediction circuits 13D1-1, 13D2-1, 13D3-1, 13D4-1, 13D5-1, and 13D6-1 are followed by buffer and selectors 14D1-1, 14D2-1, 14D3-1, 14D4-1, 14D5-1, and 14D6-1 respectively. For example, the m-th correlation circuit 60-m outputs the calculation-result signals Lf+Rf, C−Lf, Rf−Lf, Ls−Lf, Rs–Lf, and Lfe–C to prediction circuits 13D1-m, 13D2-m, 13D3-m, 13D4-m, 13D5-m, and 13D6-m respectively. The prediction circuits 13D1-m, 13D2-m, 13D3-m, 13D4-m, 13D5-m, and 13D6-m are followed by buffer and selectors 14D1-m, 14D2-m, 14D3-m, 14D4-m, 14D5-m, and 14D6-m respectively.

Thus, there are "m" groups each having one correlation circuit, 6 prediction circuits, and 6 buffer and selectors. The first prediction circuits in the respective groups are equal to each other. The second prediction circuits in the respective groups are equal to each other. The third prediction circuits in the respective groups are equal to each other. The fourth prediction circuits in the respective groups are equal to each other. The fifth prediction circuits in the respective groups are equal to each other. The sixth prediction circuits in the respective groups are equal to each other.

A selection signal/DTS generator 17E searches the 6 buffer and selectors in each of the groups for the smallest prediction-error signals. In addition, the selection signal/DTS generator 17E calculates the total data amount of the smallest prediction-error signals in each of the groups. The selection signal/DTS generator 17E compares the calculated total data amounts for the respective groups, and decides the minimum data amount among the calculated total data amounts. The selection signal/DTS generator 17E selects one from among the groups which corresponds to the decided minimum data amount. The selection signal/DTS generator 17E enables the 6 buffer and selectors in the selected group to output the smallest prediction-error signals to a packing circuit 18.

The selection signal/DTS generator 17E produces a flag representing the selected group. The selection signal/DTS generator 17E outputs the selected-group flag to a formatting circuit 19 as a correlation-circuit-selection flag.

A signal representing the coefficient "a" is applied to the formatting circuit 19. A signal representing the coefficient "b" is also applied to the formatting circuit 19. The formatting circuit 19 multiplexes or combines the correlation-circuit-selection flag, the signal of the coefficient "a", the signal of the coefficient "b", and other signals into a main bit stream.

Figure 16:
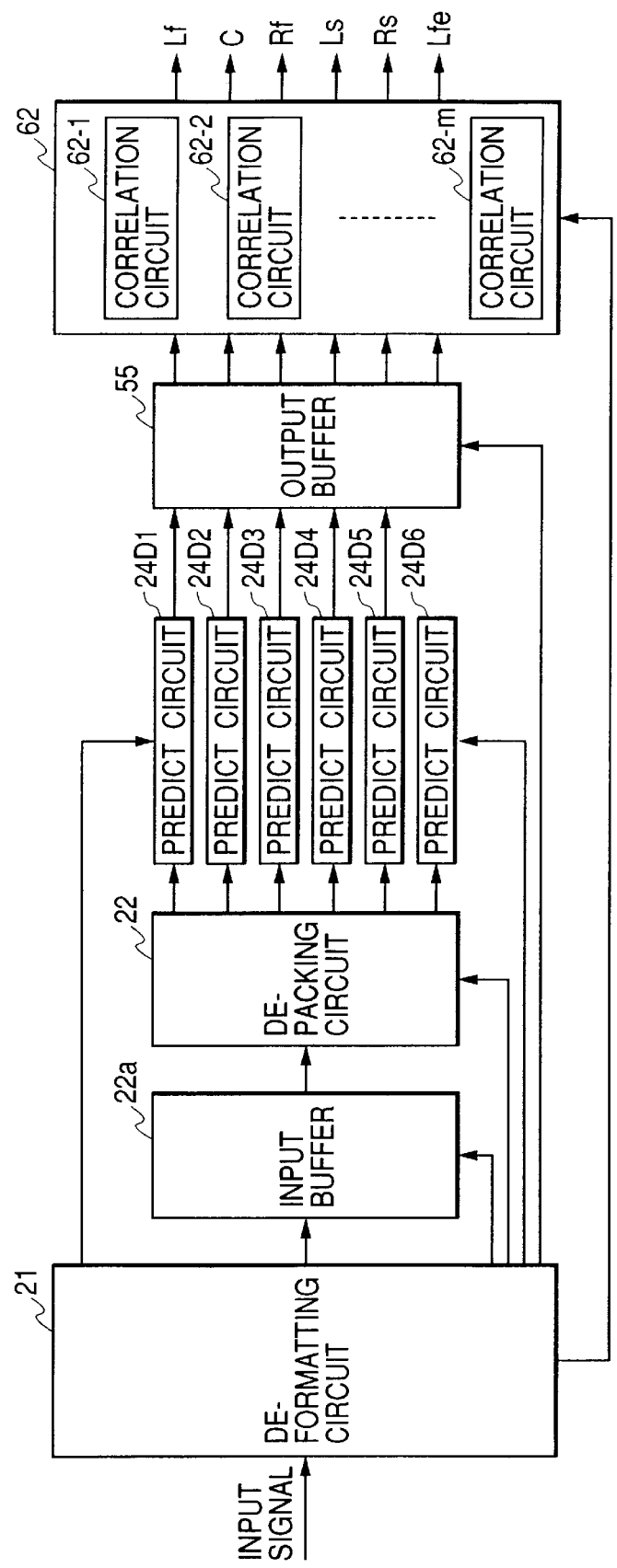
FIG. 16 is a block diagram of an audio signal decoding apparatus in the system according to the fifth embodiment of this invention.

FIG. 16 shows an audio signal decoding apparatus in the fifth embodiment of this invention. The audio signal decoding apparatus of FIG. 16 includes a set 62 of "m" correlation circuits 62-1, . . . , and 62-m. An output buffer 55 outputs 6 reproduced calculation-result signals to each of the correlation circuits 62-1, . . . , and 62-m. Regarding operation, the correlation circuits 62-1, . . . , and 62-m are inverse with respect to the correlation circuits 60-1, . . . , and 60-m, respectively.

In the audio signal decoding apparatus of FIG. 16, a deformatting circuit 21 separates the correction-circuit-selection flag, the signal of the coefficient "a", and the signal of the coefficient "b" from the main bit stream. The deformatting circuit 21 outputs the correction-circuit-selection flag, the signal of the coefficient "a", and the signal of the coefficient "b" to the correlation circuit set 62.

In the correlation circuit set 62, one of the correlation circuits 62-1, . . . , and 62-m is selected in response to the correction-circuit-selection flag. The selected correlation circuit 62-1, . . . , or 62-m corresponds to the selected correlation circuit 60-1, . . . , or 60-m in the audio signal encoding apparatus for the present output signals from the output buffer 55. The selected correlation circuit 62-1, . . . , or 62-m converts a set of the 6 reproduced calculation-result signals into a set of reproduced digital audio signals Lf, C, Rf, Ls, Rs, and Lfe. Only the selected correlation circuit 62-1, . . . , or 62-m is enabled to output the reproduced digital audio signals Lf, C, Rf, Ls, Rs, and Lfe.

A down mixing circuit may follow the correlation circuit set 62. In this case, the down mixing circuit converts a set of the reproduced digital audio signals Lf, Rf, C, Ls, Rs, and Lfe into a pair of a left-channel digital audio signal L and a right-channel digital audio signal R as the mix and matrix circuit 140 in the first embodiment of this invention does.

Sixth Embodiment

A sixth embodiment of this invention is similar to the fourth embodiment thereof except for design changes indicated hereinafter.

Figure 17:
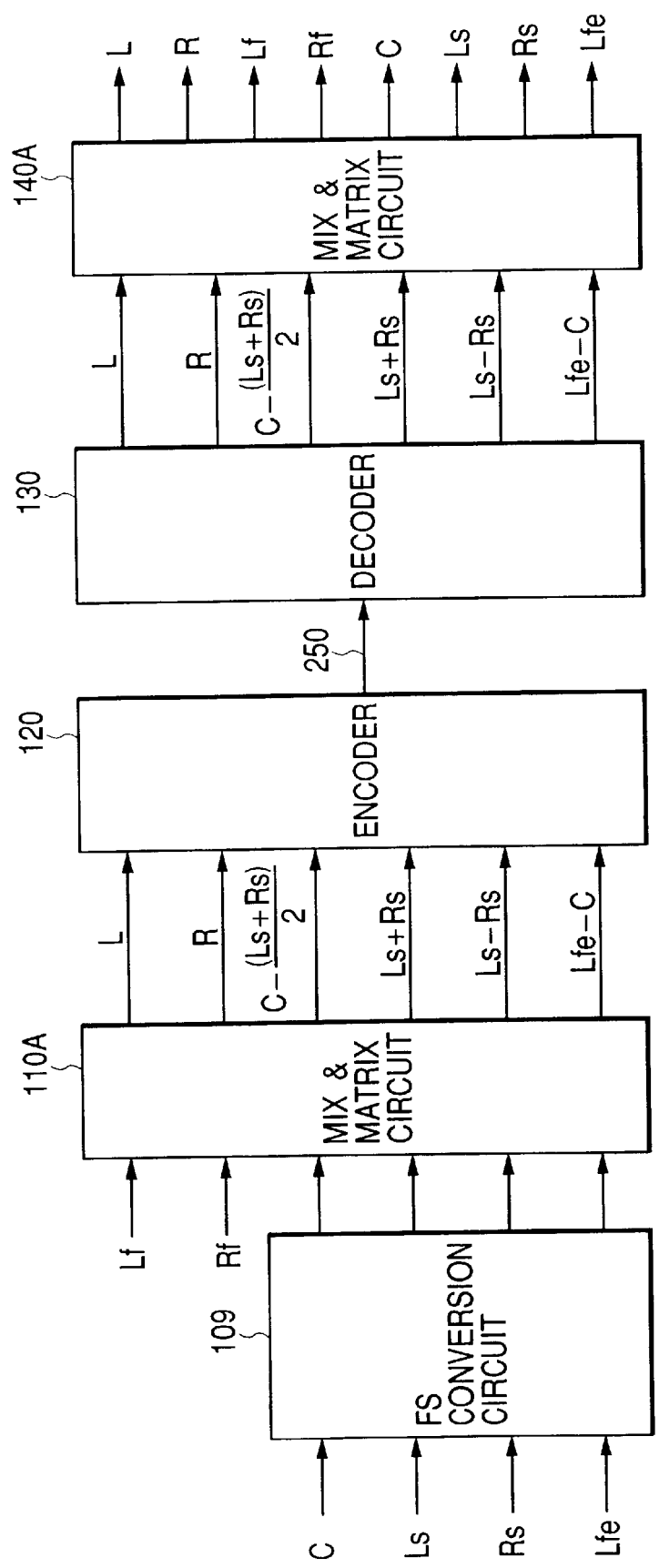
FIG. 17 is a block diagram of a system including an audio signal encoding apparatus and an audio signal decoding apparatus according to a sixth embodiment of this invention.

FIG. 17 shows an audio signal encoding apparatus in the sixth embodiment of this invention. The audio signal encoding apparatus of FIG. 17 includes an fs conversion circuit 109 receiving input digital audio signals C, Ls, Rs, and Lfe. Input digital audio signals Lf and Rf are directly fed to the mix and matrix circuit 11A. The fs conversion circuit 109 equalizes the sampling frequencies of the input digital audio signals C, Ls, Rs, and Lfe to a predetermined frequency. Preferably, the predetermined frequency is equal to the highest frequency among the sampling frequencies of the input digital audio signals C, Ls, Rs, and Lfe. The fs conversion circuit 109 outputs the conversion-resultant digital audio signals C, Ls, Rs, and Lfe to the mix and matrix circuit 110A. Accordingly, the mix and matrix circuit 110A processes a set of the input digital audio signals Lf and Rf, and the conversion-resultant digital audio signals C, Ls, Rs, and Lfe outputted from the fs conversion circuit 109.

The fs conversion circuit 109 enables the mix and matrix circuit 110A to suitably operate even in the case where the input digital audio signals C, Ls, Rs, and Lfe have different sampling frequencies.

Seventh Embodiment

A seventh embodiment of this invention is similar to the first embodiment thereof except for design changes indicated hereinafter.

Figure 18:
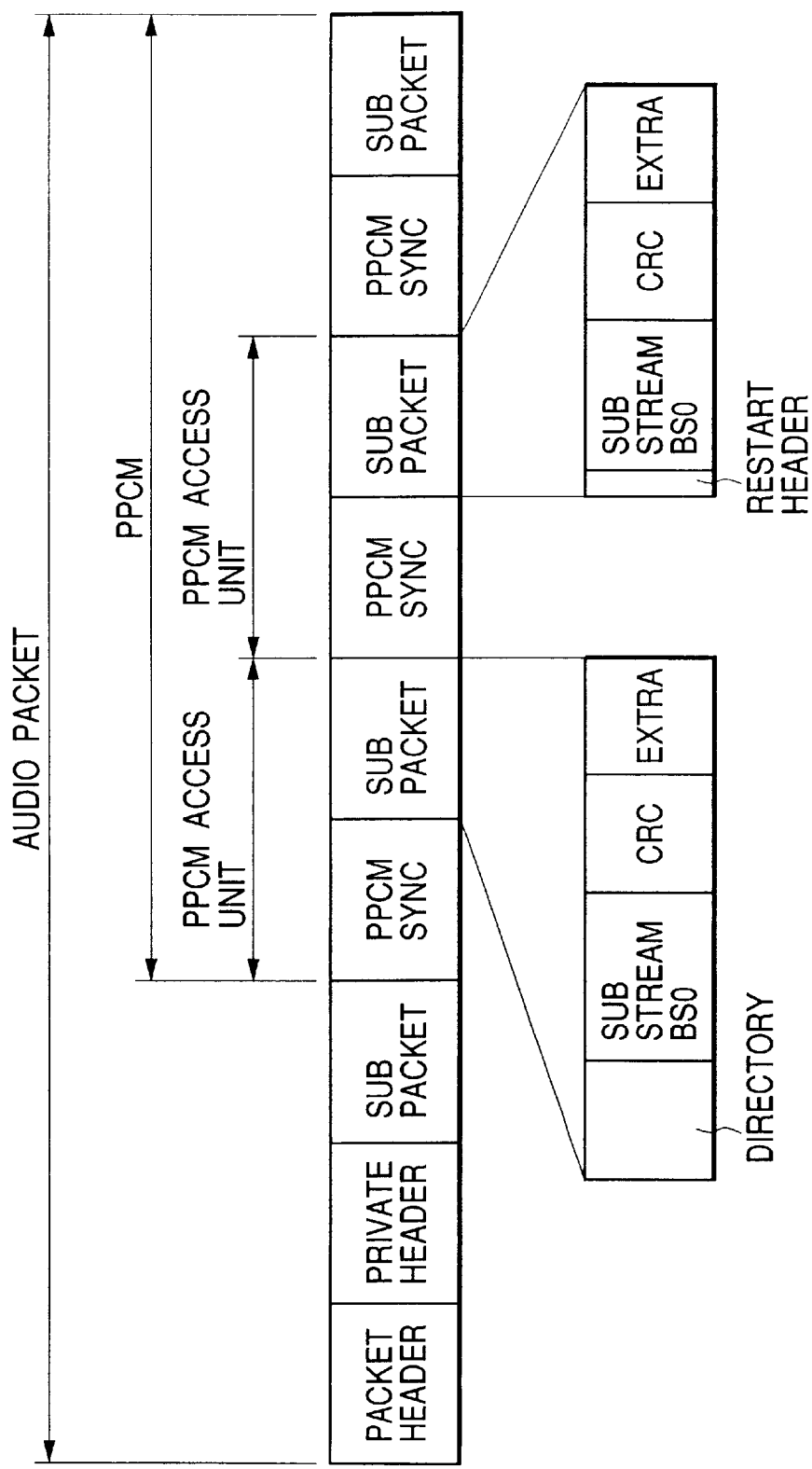
FIG. 18 is a diagram of a structure of an audio packet used in a seventh embodiment of this invention.

FIG. 18 shows a structure of an audio packet used in the seventh embodiment of this invention. As shown in FIG. 18, audio data in one audio packet has PPCM sync signals and sub packets. The PPCM sync signals alternate with the sub packets. Each PPCM sync signal and a following sub packet compose a PPCM access unit. The sub packet in the first PPCM access unit has a sequence of a directory signal, a portion of the sub bit stream BS0, a CRC (cyclic redundancy check) signal, and an extra information piece. Thus, the sub packet in the first PPCM access unit is devoid of a portion of the sub bit stream BS1 (see FIG. 6). The sub packet in each of the second and later PPCM access units has a sequence of a restart header, a portion of the sub bit stream BS0, a CRC signal, and an extra information piece. Thus, the sub packet in each of the second and later PPCM is devoid of a portion of the sub bit stream BS1 (see FIG. 6).

The digital audio signals L and R are placed and in the sub bit stream BS0 while other channel signals are not placed therein.

What is claimed is:

1. An audio signal encoding apparatus comprising:
   means for implementing matrix operation among first multiple-channel digital audio signals to generate second multiple-channel audio signals correlating with each other, the first multiple-channel digital audio signals relating to a sampling frequency and a quantization bit number;
   means for compressing the second multiple-channel digital audio signals into compression-resultant multiple-channel signals respectively, the compression-resultant multiple-channel signals relating to a smallest prediction-error basis lossless compression; and means for formatting the compression-resultant multiple-channel signals, into a formatting-resultant signal, the formatting-resultant signal containing an access unit composed of a sub packet and a sync information portion, the sub packet containing at least portions of the compression-resultant multiple-channel signals, the sync information portion containing the signal representative of the sampling frequency and the signal representative of the quantization bit number, where said access unit is of variable length and said compression-resultant multiple-channel signals are compressed with a variable bit rate.

2. An audio signal encoding apparatus as recited in claim 1, further comprising means for formatting an audio packet into an audio pack, the audio packet containing said formatting-resultant signal.

3. An audio signal decoding apparatus for decoding an input audio signal into original multiple-channel digital audio signals, wherein the input audio signal has been generated by an audio signal encoding apparatus comprising 1) means for implementing matrix operation among first multiple-channel digital audio signals to generate second multiple-channel audio signals correlating with each other, the first multiple-channel digital audio signals relating to a sampling-frequency and a quantization bit number; 2) means for compressing the second multiple-channel audio signals into compression-resultant multiple-channel signals respectively, the compression-resultant multiple-channel signals relating to a smallest-prediction-error basis lossless compression; and 3 means for formatting the compression-resultant multiple-channel signals into formatting-resultant signal, the formatting-resultant signal containing an access unit composed of a sub packet and a sync information portion, the sub packet containing at least portions of the compression-resultant multiple-channel signals, the sync information portion containing the signal representative of the sampling frequency and the signal representative of the quantization bit number, where said access unit is of variable length and said compression-resultant multiple-resultant multiple-channel signals are compressed with a variable bit rate; the audio signal decoding apparatus comprising:

means for separating a formatting-resultant signal into an access unit composed of a sub packet and a sync information portion, where said access unit is of variable length;

means for extracting compression-resultant multiple-channel signals from the sub packet of the access unit;

means for expanding the extracted compression-resultant multiple-channel signals into multiple-channel digital audio signals respectively, where said compression-resultant multiple-channel signals are compressed with a variable bit rate;

means for extracting a signal representative of a sampling frequency and a signal representative of a quantization bit number from the sync information portion; and means for converting the multiple-channel digital audio signals into analog audio signals in response to the signal representative of the sampling frequency and the signal representative of the quantization bit number.

4. An audio signal decoding apparatus as recited in claim 3, further comprising means for separating an audio packet from an audio pack, the audio packet containing said formatting-resultant signal.

5. A method of transmitting an audio signal, comprising the steps of:

implementing matrix operation among first multiple-channel digital audio signals to generate second multiple-channel audio signals correlating with each other, the first multiple-channel digital audio signals relating to a sampling frequency and a quantization bit number;

compressing the second multiple-channel digital audio signals into compression-resultant multiple-channel signals respectively, the compression-resultant multiple-channel signals relating to a smallest-prediction-error basis lossless compression;

formatting the compression-resultant multiple-channel signals into a formatting-resultant signal, the formatting-resultant signal containing an access unit composed of a sub packet and a sync information portion, the sub packet containing at least portions of the compression-resultant multiple-channel signals, the sync information portion containing the signal representative of the sampling frequency, and the signal representative of the quantization bit number, where said access unit is of variable length and said compression-resultant multiple-channel signals are compressed with a variable bit rate; and transmitting the formatting-resultant signal through a communication line.

6. A transmission medium for transmitting a formatting-resultant signal which is decoded by an audio signal decoding apparatus for decoding an input audio signal into original multiple-channel digital audio signals, wherein the input audio signal has been generated by an audio signal encoding apparatus comprising 1) means for implementing matrix operation among first multiple-channel digital audio signals to generate second multiple-channel audio signals correlating with each other, the first multiple-channel digital audio signals relating to a sampling frequency and a quantization bit number; 2) means for compressing the second multiple-channel audio signals into compression-resultant multiple-channel signals respectively, the compression-resultant multiple-channel signals relating to a smallest prediction-error basis lossless compression, and 3) means for formatting the compression-resultant multiple-channel signals into formatting-resultant signal, the formatting-resultant signal containing an access unit composed of a sub packet and a sync information portion, the sub packet containing least portions of the compression-resultant multiple-channel signals, the sync information portion containing the signal representative of the sampling frequency and the signal representative of the quantization bit number, where said access unit is of variable length and said compression-resultant multiple-channel signals are compressed with a variable bit rate, the transmission medium comprising:

means for separating a formatting-resultant signal into an access unit composed of a sub packet and a sync information portion, where said access unit is of variable length;

means for extracting compression-resultant multiple-channel signals from the sub packet of the access unit;

means for expanding the extracted compression-resultant multiple-channel signals into multiple-channel digital audio signals respectively, where said compression-resultant multiple-channel signal are compressed with a variable bit rate; and means for extracting a signal representative of a sampling frequency and a signal representative of a quantization bit number from the sync information portion.

* * * * *